United States Patent
Ho et al.

(10) Patent No.: US 9,130,702 B2
(45) Date of Patent: Sep. 8, 2015

(54) DOWNLINK FLOW CONTROL

(71) Applicant: QUALCOMM Incorporated, San Diego, CA (US)

(72) Inventors: Sai Yiu Duncan Ho, San Diego, CA (US); Arnaud Meylan, San Diego, CA (US); Etienne Francois Chaponniere, San Diego, CA (US); Francesco Grilli, La Jolla, CA (US); Shailesh Maheshwari, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/469,462

(22) Filed: Aug. 26, 2014

(65) Prior Publication Data

US 2014/0362695 A1    Dec. 11, 2014

Related U.S. Application Data

(63) Continuation of application No. 12/338,969, filed on Dec. 18, 2008, now Pat. No. 8,917,598.

(60) Provisional application No. 61/015,987, filed on Dec. 21, 2007, provisional application No. 61/036,407, filed on Mar. 13, 2008.

(51) Int. Cl.
   *H04L 1/00*        (2006.01)
   *H04L 12/815*      (2013.01)
   (Continued)

(52) U.S. Cl.
   CPC ............ *H04L 1/001* (2013.01); *H04L 47/225* (2013.01); *H04L 47/263* (2013.01); *H04L 47/39* (2013.01);
   (Continued)

(58) Field of Classification Search
   CPC ........ H04L 1/001; H04L 47/14; H04W 28/12

USPC ........................................ 370/235; 455/452.2
See application file for complete search history.

(56) References Cited

U.S. PATENT DOCUMENTS

| 5,535,214 A | 7/1996 | Shiobara |
| 5,592,470 A | 1/1997 | Rudrapatna et al. |

(Continued)

FOREIGN PATENT DOCUMENTS

| CN | 1478345 A | 2/2004 |
| CN | 1689261 A | 10/2005 |

(Continued)

OTHER PUBLICATIONS

3GPP TS 36.321, V8.0.0, Medium Access Control Protocol Specification Dec. 1, 2007, [Online] (Dec. 1, 2007), pp. 1-23, XP002521635 Retrieved from the Internet : URL: http://www.quintillion.co.jp/3GPP/Specs/36321-800.pdf.

(Continued)

*Primary Examiner* — Wanda Z Russell
(74) *Attorney, Agent, or Firm* — John J. Ketchum

(57) ABSTRACT

Systems and methodologies are described that facilitate providing flow control feedback for controlling downlink data transmission rates. Various schemes can be utilized to send the flow control feedback from an access terminal to a base station. For example, a control PDU (e.g., MAC control PDU, PDCP control PDU) can be generated based upon a level of resource utilization of the access terminal, and sent to the base station for controlling the downlink data transmission rate. Following this example, a type of control PDU, a value included within the control PDU, etc. can be selected as a function of the level of resource utilization. By way of another illustration, a CQI report that includes a value selected as a function of the level of resource utilization associated with the access terminal can be generated and transmitted to the base station for controlling the downlink data transmission rate.

20 Claims, 17 Drawing Sheets

(51) Int. Cl.
*H04L 12/825* (2013.01)
*H04W 28/12* (2009.01)
*H04W 28/02* (2009.01)
*H04W 28/10* (2009.01)
*H04L 12/801* (2013.01)
*H04W 28/22* (2009.01)

(52) U.S. Cl.
CPC .......... *H04W 28/0236* (2013.01); *H04W 28/10* (2013.01); *H04W 28/12* (2013.01); *H04L 47/14* (2013.01); *H04W 28/22* (2013.01)

(56) References Cited

U.S. PATENT DOCUMENTS

| | | | |
|---|---|---|---|
| 5,987,326 | A | 11/1999 | Tiedemann, Jr. et al. |
| 6,046,980 | A | 4/2000 | Packer |
| 6,134,218 | A | 10/2000 | Holden |
| 6,192,422 | B1 | 2/2001 | Daines et al. |
| 6,351,460 | B1 | 2/2002 | Tiedemann, Jr. et al. |
| 6,469,991 | B1 | 10/2002 | Chuah |
| 6,834,185 | B2 | 12/2004 | Fujii |
| 6,847,623 | B1 | 1/2005 | Vayanos et al. |
| 6,983,153 | B2 | 1/2006 | Jain et al. |
| 7,003,269 | B2 | 2/2006 | Willenegger |
| 7,127,255 | B2 | 10/2006 | Hsu et al. |
| 7,167,487 | B2 | 1/2007 | Herrmann |
| 7,508,762 | B2 | 3/2009 | Ohtani |
| 7,710,893 | B2 * | 5/2010 | Yoon et al. .................. 370/252 |
| 7,764,661 | B2 | 7/2010 | Heo et al. |
| 8,005,089 | B2 | 8/2011 | Chun et al. |
| 8,656,239 | B2 | 2/2014 | Ho |
| 8,699,487 | B2 | 4/2014 | Damnjanovic et al. |
| 2003/0035383 | A1 | 2/2003 | Hershey |
| 2003/0054847 | A1 * | 3/2003 | Kim et al. .................. 455/517 |
| 2003/0104817 | A1 | 6/2003 | Damnjanovic |
| 2003/0147371 | A1 | 8/2003 | Choi et al. |
| 2003/0222817 | A1 | 12/2003 | Gfeller et al. |
| 2004/0017795 | A1 | 1/2004 | Abraham et al. |
| 2004/0203973 | A1 | 10/2004 | Khan |
| 2005/0111451 | A1 | 5/2005 | Kim |
| 2005/0143084 | A1 * | 6/2005 | Cheng et al. .................. 455/452.2 |
| 2005/0250454 | A1 | 11/2005 | Sebire et al. |
| 2005/0256886 | A1 | 11/2005 | Armanino et al. |
| 2005/0265301 | A1 * | 12/2005 | Heo et al. .................. 370/349 |
| 2005/0276359 | A1 | 12/2005 | Xiong |
| 2006/0120403 | A1 | 6/2006 | Murata et al. |
| 2006/0146875 | A1 | 7/2006 | Yang |
| 2006/0182080 | A1 | 8/2006 | Yang et al. |
| 2007/0019552 | A1 | 1/2007 | Senarath et al. |
| 2007/0189248 | A1 | 8/2007 | Chang et al. |
| 2007/0201369 | A1 | 8/2007 | Pedersen et al. |
| 2007/0245202 | A1 | 10/2007 | Kim et al. |
| 2007/0248035 | A1 | 10/2007 | Sang et al. |
| 2007/0253449 | A1 | 11/2007 | Das et al. |
| 2008/0002688 | A1 | 1/2008 | Kim et al. |
| 2008/0004030 | A1 | 1/2008 | Frederiksen et al. |
| 2008/0026744 | A1 * | 1/2008 | Frederiksen et al. .......... 455/425 |
| 2008/0109694 | A1 | 5/2008 | Jen |
| 2008/0117881 | A1 | 5/2008 | Golitschek Edler Von Elbwart et al. |
| 2008/0161033 | A1 | 7/2008 | Borran et al. |
| 2008/0232284 | A1 | 9/2008 | Dalsgaard et al. |
| 2008/0240030 | A1 | 10/2008 | Kolding et al. |
| 2008/0310345 | A1 | 12/2008 | Chun et al. |
| 2009/0092148 | A1 | 4/2009 | Zhang et al. |
| 2009/0109907 | A1 * | 4/2009 | Tsai et al. .................. 370/329 |
| 2009/0122776 | A1 * | 5/2009 | Folkstedt et al. .......... 370/342 |
| 2009/0141668 | A1 | 6/2009 | Zhang et al. |
| 2009/0141676 | A1 | 6/2009 | Maheshwari et al. |
| 2009/0161545 | A1 | 6/2009 | Ho et al. |
| 2009/0196275 | A1 | 8/2009 | Damnjanovic et al. |
| 2009/0196364 | A1 | 8/2009 | Nakajima et al. |
| 2009/0310693 | A1 * | 12/2009 | Baker et al. .................. 375/260 |
| 2010/0095183 | A1 | 4/2010 | Petrovic et al. |
| 2010/0198943 | A1 * | 8/2010 | Harrang et al. .................. 709/217 |
| 2010/0235705 | A1 | 9/2010 | Kim et al. |
| 2010/0254480 | A1 | 10/2010 | Park et al. |
| 2010/0281325 | A1 | 11/2010 | Lohr et al. |

FOREIGN PATENT DOCUMENTS

| | | |
|---|---|---|
| CN | 1799231 A | 7/2006 |
| CN | 1910886 A | 2/2007 |
| CN | 1961502 A | 5/2007 |
| EP | 627827 | 12/1994 |
| EP | 1071226 A1 | 1/2001 |
| EP | 1341336 A1 | 9/2003 |
| EP | 1353483 A2 | 10/2003 |
| EP | 1389847 A1 | 2/2004 |
| EP | 1511239 A2 | 3/2005 |
| JP | 2000183884 A | 6/2000 |
| JP | 2003318814 A | 11/2003 |
| JP | 2005073276 | 3/2005 |
| JP | 2005518143 A | 6/2005 |
| JP | 2005536159 A | 11/2005 |
| JP | 2006157134 A | 6/2006 |
| JP | 2006287522 A | 10/2006 |
| JP | 2007529938 A | 10/2007 |
| JP | 2007536826 A | 12/2007 |
| JP | 2008503182 A | 1/2008 |
| JP | 2009525655 A | 7/2009 |
| JP | 2012114957 A | 6/2012 |
| KR | 20070024427 | 3/2007 |
| RU | 2149518 | 5/2000 |
| RU | 2216868 C2 | 11/2003 |
| RU | 2280958 C2 | 7/2006 |
| WO | WO-9835525 | 8/1998 |
| WO | WO-0072622 | 11/2000 |
| WO | WO-0101624 A1 | 1/2001 |
| WO | WO-0241531 | 5/2002 |
| WO | WO-02052800 A1 | 7/2002 |
| WO | WO-02101956 A1 | 12/2002 |
| WO | WO-03047206 A1 | 6/2003 |
| WO | WO-03069835 A1 | 8/2003 |
| WO | WO-03071707 A1 | 8/2003 |
| WO | WO-2004019543 A1 | 3/2004 |
| WO | WO-2004042963 A1 | 5/2004 |
| WO | WO-2004109991 | 12/2004 |
| WO | WO-2005067262 | 7/2005 |
| WO | WO-2005109727 A1 | 11/2005 |
| WO | WO-2005125020 A1 | 12/2005 |
| WO | WO-2005125226 A2 | 12/2005 |
| WO | WO-2006030019 A2 | 3/2006 |
| WO | WO-2006049438 A1 | 5/2006 |
| WO | WO-2006051149 A1 | 5/2006 |
| WO | WO-2006104344 | 10/2006 |
| WO | WO-2006109123 A2 | 10/2006 |
| WO | WO-2007024120 A1 | 3/2007 |
| WO | WO-2007058178 A1 | 5/2007 |
| WO | WO-2007078173 A1 | 7/2007 |
| WO | WO-2007087057 | 8/2007 |
| WO | WO-2007088465 A2 | 8/2007 |

OTHER PUBLICATIONS

European Search Report—EP13020034—Search Authority—Munich—Jul. 23, 2013.
IEEE Computer Society and the IEEE Microwave Theory and Techniques Society: "IEEE Standard for Local and metropolitan area networks—Part 16: Air Interface for Fixed and Mobile Broadband Wireless Access Systems; Amendment 2: Physical and Medium Access Control Layers for Combined Fixed and Mobile Operation in Licensed Bands and Corrigendum 1"; IEEE Std 802.16e-2005 and IEEE Std 802.16-2004/Cor1-2005 (Feb. 28, 2006), XP017601713.
International Search Report and Written Opinion—PCT/US08/087826, International Search Authority—European Patent Office—Aug. 3, 2009.
Motorola: "Flow control" 3GPP Draft, R2-073540, Athens, Greece, Aug 20-24, 2007 pp. 1-2.
NEC, et al: "DL flow control in LTE" 3GPP Draft, R2-081777, Shenzhen, China, Mar. 31-Apr. 4, 2008, Ch 2.1 Solutions.

(56) References Cited

OTHER PUBLICATIONS

Panasonic: "MAC flow control and related signaling" 3GPP Draft, R2-074147, Shanghai, China, Oct. 8-12, 2007.
Philips: "UE flow control when relaying to other interfaces e.g. to a bluetooth link" 3GPP Draft, TSGR2#32(02)2628, RAN WG2, Sep. 23-27, 2002, Xi"an, China, p. 2.
Qualcomm Europe: "DL flow control in LTE" 3GPP Draft, R2-080374, Sevilla, Spain, Jan. 14-18, 2008, pp. 1-2.
Qualcomm Europe: "Happy Bits", 3GPP TSG-RAN WG2 #61, R2-081065, Feb. 11, 2008.
Rapporteur: "Draft TR 25.877 v2.0.0: High speed downlink packet access: Iub/Iur protocol aspects" 3GPP Draft, R3-020892, Orlando, FL US, Feb. 18-22, 2002, pp. 47-49.
Taiwan Search Report—TW097150093—TIPO—Jan. 18, 2012.
The CDMA 2000 ITU-R RTT Candidate Submission 0,19 Online Jul. 27, 1998.

* cited by examiner

DOWNLINK FLOW CONTROL

CROSS-REFERENCE TO RELATED APPLICATIONS

This application is a continuation application of U.S. patent application Ser. No. 12/338,969, entitled "DOWNLINK FLOW CONTROL," filed Dec. 18, 2008, which claimed the benefit of and priority to U.S. Provisional Patent Application No. 61/015,987, entitled "METHODS AND APPARATUSES FOR DOWNLINK FLOW CONTROL," filed Dec. 21, 2007, and U.S. Provisional Patent Application No. 61/036,407, entitled "METHODS AND APPARATUSES FOR DOWNLINK FLOW CONTROL UTILIZING CHANNEL QUALITY INDICATOR (CQI)," filed Mar. 13, 2008. The entireties of the aforementioned applications are herein incorporated by reference.

BACKGROUND

I. Field

The following description relates generally to wireless communications, and more particularly to providing feedback related to resource utilization of an access terminal that can be leveraged for downlink flow control in a Long Term Evolution (LTE) based wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ...). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Access terminals typically support multimedia and many different applications running concurrently (e.g., email, voice, video, ...). Long Term Evolution (LTE) based environments can also enable supporting very high data rates (e.g., data can be sent over the downlink at rates on the order of 100 Mbit/s, 300 Mbit/s, ...). Further, each application can demand a certain amount of resources from the access terminal (e.g., processing power, buffers, battery power, ...). Moreover, the amount of resources needed at a given time can be dynamic.

It is to be appreciated that access terminals can be designed to handle the sum of maximum instantaneous requirements of all applications that can be effectuated therewith. To maintain costs associated with access terminals at a reasonable level, however, access terminals can be designed to handle common load conditions rather than peak instantaneous requirements, which can be significantly larger than the common load. For example, the peak instantaneous requirements can occur when all applications supported by an access terminal happen to launch concurrently while the access terminal is simultaneously receiving data at the peak rate via the downlink. Thus, the access terminal can be provisioned to handle the peak rate for a short duration of time rather than being able to sustain operability at the peak rate for an extended period of time, which in turn can significantly reduce costs associated with the access terminal.

If an access terminal is not over-dimensioned (e.g., designed to accommodate common load conditions rather than peak instantaneous requirements for an extended period of time, ...), it can run low in resources. When availability of resources of an access terminal is low, the access terminal can attempt to reduce its load. However, LTE currently fails to support providing feedback from the access terminal to the base station when the access terminal is experiencing low resources. For example, if the base station is sending data to the access terminal at a high speed (e.g., 100 Mbit/s, ...) for an extended period of time, the access terminal can be unable to handle processing of such downlink data and/or the buffer can become full; meanwhile, the access terminal can lack a manner by which it can notify the base station to reduce the downlink transmission rate.

In UMTS Terrestrial Radio Access Network (UTRAN), flow control is supported in Radio Link Control (RLC). According to an illustration, an access terminal operating in UTRAN can set a transmitting window size of a base station for flow control purposes; thus, when the access terminal is congested, the access terminal can collapse the transmitting window size of the base station. The aforementioned flow control technique utilized in UTRAN, however, is not applicable to LTE since the RLC has been redefined in LTE. Accordingly, utilization of the RLC for flow control is inoperable in LTE.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating providing of flow control feedback for controlling downlink data transmission rates. Various schemes can be utilized to send the flow control feedback from an access terminal to a base station. For example, a control PDU (e.g., MAC control PDU, PDCP control PDU) can be generated based upon a level of resource utilization of the access terminal, and sent to the base station for controlling the downlink data transmission rate. Following this example, a type of control PDU, a value included within the control PDU, etc. can be selected as a function of the level of resource utilization. By way of another illustration, a CQI report that includes a value selected as a function of the level of resource utilization associated with the access terminal can be generated and transmitted to the base station for controlling the downlink data transmission rate.

According to related aspects, a method that facilitates providing downlink flow control in a wireless communication environment is described herein. The method can include monitoring resource use associated with an access terminal. Further, the method can comprise generating a control protocol data unit (PDU) based upon the resource use associated with the access terminal. Moreover, the method can include sending the control PDU to a base station to manage a downlink data transmission rate.

Another aspect relates to a wireless communications apparatus. The wireless communications apparatus can include a memory that retains instructions related to generating a control protocol data unit (PDU) based upon detected resource use associated with an access terminal, and transmitting the control PDU to a base station to control a downlink data transmission rate. Further, the wireless communications apparatus can include a processor, coupled to the memory, configured to execute the instructions retained in the memory.

Yet another aspect relates to a wireless communications apparatus that enables providing flow control feedback to a base station using control protocol data units (PDUs) in a wireless communication environment. The wireless communications apparatus can include means for tracking resource utilization associated with an access terminal. Moreover, the wireless communications apparatus can include means for yielding a control PDU as a function of the resource utilization associated with the access terminal. Further, the wireless communications apparatus can comprise means for transmitting the control PDU to a base station to control a downlink data transmission rate.

Still another aspect relates to a computer program product that can comprise a computer-readable medium. The computer-readable medium can include code for generating a control protocol data unit (PDU) based upon detected resource use associated with an access terminal. Further, the computer-readable medium can include code for transmitting the control PDU to a base station to control a downlink data transmission rate.

According to other aspects, a method that facilitates providing downlink flow control in a wireless communication environment is described herein. The method can include detecting a level of resource utilization associated with an access terminal. Further, the method can include generating a channel quality indicator (CQI) report that includes a value selected as a function of the level of resource utilization associated with the access terminal. Moreover, the method can include transmitting the CQI report that includes the selected value to a base station to control a downlink data transmission rate.

Yet another aspect relates to a wireless communications apparatus that can include a memory that retains instructions related to detecting a level of resource utilization associated with an access terminal, generating a channel quality indicator (CQI) report that includes a value selected as a function of the level of resource utilization associated with the access terminal, and transmitting the CQI report that includes the selected value to a base station to control a downlink data transmission rate. Further, the wireless communications apparatus can comprise a processor, coupled to the memory, configured to execute the instructions retained in the memory.

Another aspect relates to a wireless communications apparatus that enables yielding flow control feedback to a base station using channel quality indicator (CQI) reports in a wireless communication environment. The wireless communications apparatus can include means for detecting resource utilization associated with an access terminal. Moreover, the wireless communications apparatus can comprise means for yielding a CQI report that includes a value selected as a function of the resource utilization associated with the access terminal. Further, the wireless communications apparatus can include means for sending the CQI report that includes the selected value to a base station to control a downlink data transmission rate.

Still another aspect relates to a computer program product that can comprise a computer-readable medium. The computer-readable medium can include code for detecting a level of resource utilization associated with an access terminal. Further, the computer-readable medium can include code for generating a channel quality indicator (CQI) report that includes a value selected as a function of the level of resource utilization associated with the access terminal. Moreover, the computer-readable medium can include code for transmitting the CQI report that includes the selected value to a base station to control a downlink data transmission rate.

According other aspects, a method that facilitates controlling a downlink data transmission rate for an access terminal based upon flow control feedback from the access terminal in a wireless communication environment is described herein. The method can include receiving a control protocol data unit (PDU) that provides flow control feedback from an access terminal. Further, the method can comprise analyzing the control PDU to recognize the flow control feedback. Moreover, the method can include adjusting a downlink data transmission rate for the access terminal based upon the flow control feedback provided by the control PDU.

Another aspect relates to a wireless communications apparatus. The wireless communications apparatus can include a memory that retains instructions related to receiving a channel quality indicator (CQI) report that includes a value corresponding to flow control feedback from an access terminal, evaluating the value included in the CQI report to determine the flow control feedback, and adjusting a downlink data transmission rate for the access terminal based upon the flow control feedback provided by the CQI report. Further, the wireless communications apparatus can include a processor, coupled to the memory, configured to execute the instructions retained in the memory.

Yet another aspect relates to a wireless communications apparatus that enables altering a downlink data transmission rate employing flow control feedback in a wireless communication environment. The wireless communications apparatus can include means for obtaining a channel quality indicator (CQI) report that includes a value corresponding to flow control feedback from an access terminal. Moreover, the wireless communications apparatus can include means for analyzing the value included in the CQI report to identify the flow control feedback. Further, the wireless communications apparatus can include means for modifying a downlink data transmission rate for the access terminal based upon the flow control feedback provided by the CQI report.

Still another aspect relates to a computer program product that can comprise a computer-readable medium. The computer-readable medium can include code for obtaining a control protocol data unit (PDU) that provides flow control feedback from an access terminal. Moreover, the computer-readable medium can include code for evaluating the control PDU to identify the flow control feedback. Further, the computer-readable medium can include code for altering a downlink data transmission rate for the access terminal based upon the flow control feedback provided by the control PDU.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
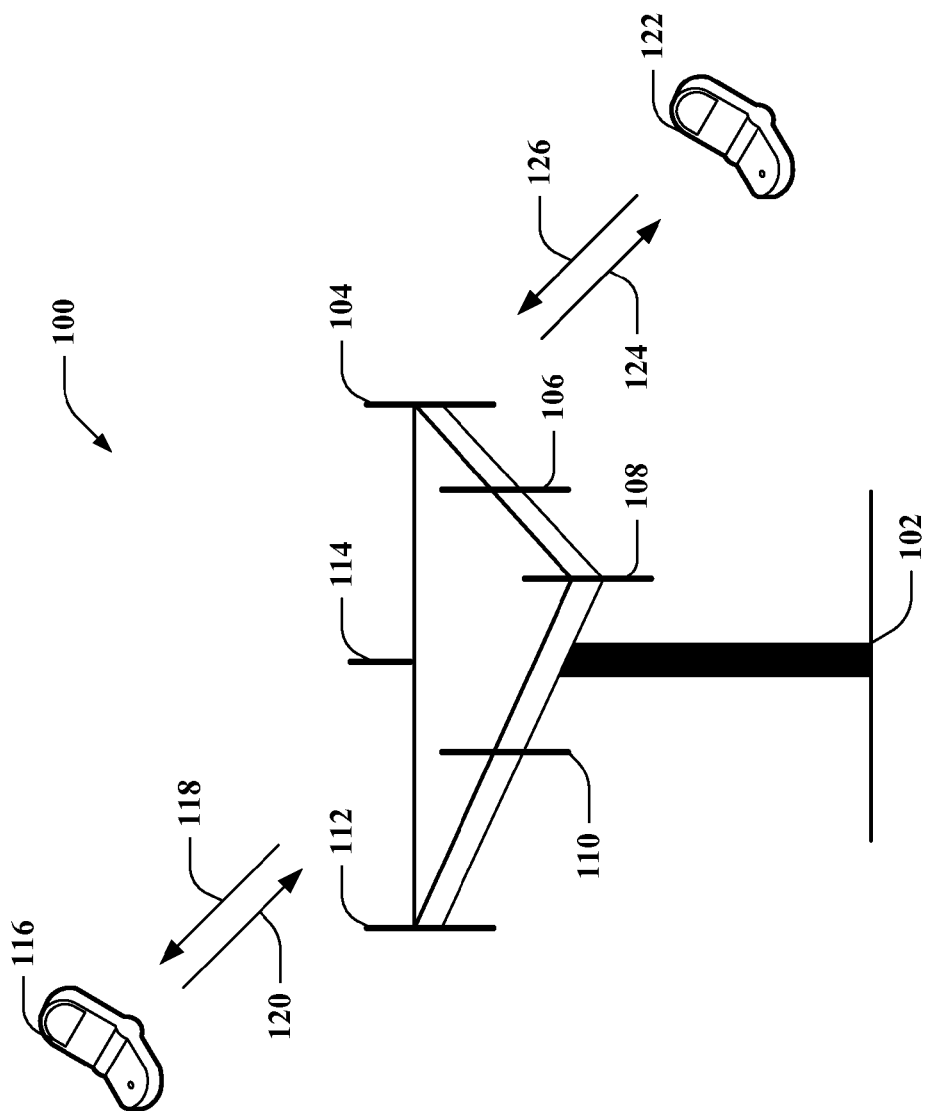
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

In system 100, access terminals 116, 122 can each monitor their respective resource utilization. For instance, resources of access terminals 116, 122 can include processor cycles, power levels, buffer availability, bus bandwidth, and so forth. By way of illustration, in Long Term Evolution (LTE), access terminals 116, 122 can handle very high data rates. Due to cost effective implementation, resources of access terminals 116, 122 can run low during a given scenario (e.g., when a user application is started while access terminal 116, 122 is receiving data over the downlink at a high rate, . . . ). Accordingly, system 100 can achieve downlink flow control. By monitoring respective resource utilization, access terminals 116, 122 can send feedback to base station 102 requesting reduction in respective downlink data transmission rate to temporarily mitigate resource requirements for each respective access terminal 116, 122. Further, when the resource utilization level of a particular access terminal 116, 122 returns to normal (e.g., non-elevated level, below a threshold, . . . ), the particular access terminal 116, 122 can transmit a request to base station 102 to resume normal data transmission over the downlink. Accordingly, access terminals 116, 122 can send flow control feedback to base station 102, and base station 102 can react to the feedback by reducing throughput (e.g., when resource utilization of the respective access terminal 116, 122 is low, ... ) and/or increasing the throughput (e.g., when resource utilization of the respective access terminal 116, 122 returns to normal, ... ).

System 100 can leverage a standardized flow control procedure that allows a resource-limited access terminal (e.g., access terminal 116, access terminal 122, ... ) to throttle sending of data by base station 102, thus enabling base station 102 to beneficially reallocate physical resources to other access terminals. Downlink flow control as described herein can yield significant benefits. For example, downlink flow control can provide flexibility for access terminal implementation, which can result in reducing costs associated with access terminals 116, 122 (e.g., an access terminal can share certain resources among applications to achieve multiplexing gain, ... ). Further, downlink flow control can protect access terminals 116, 122 from an overload scenario. Moreover, downlink flow control can provide an effective means for access terminals 116, 122 to cope with a high peak data rate to average data rate ratio without over-dimensioning such access terminals 116, 122. Downlink flow control can also result in enhancing user experience (e.g., user applications can launch faster, an access terminal 116, 122 can invoke flow control to reduce best-effort flow temporarily when the application is being launched, ... ).

Figure 2:
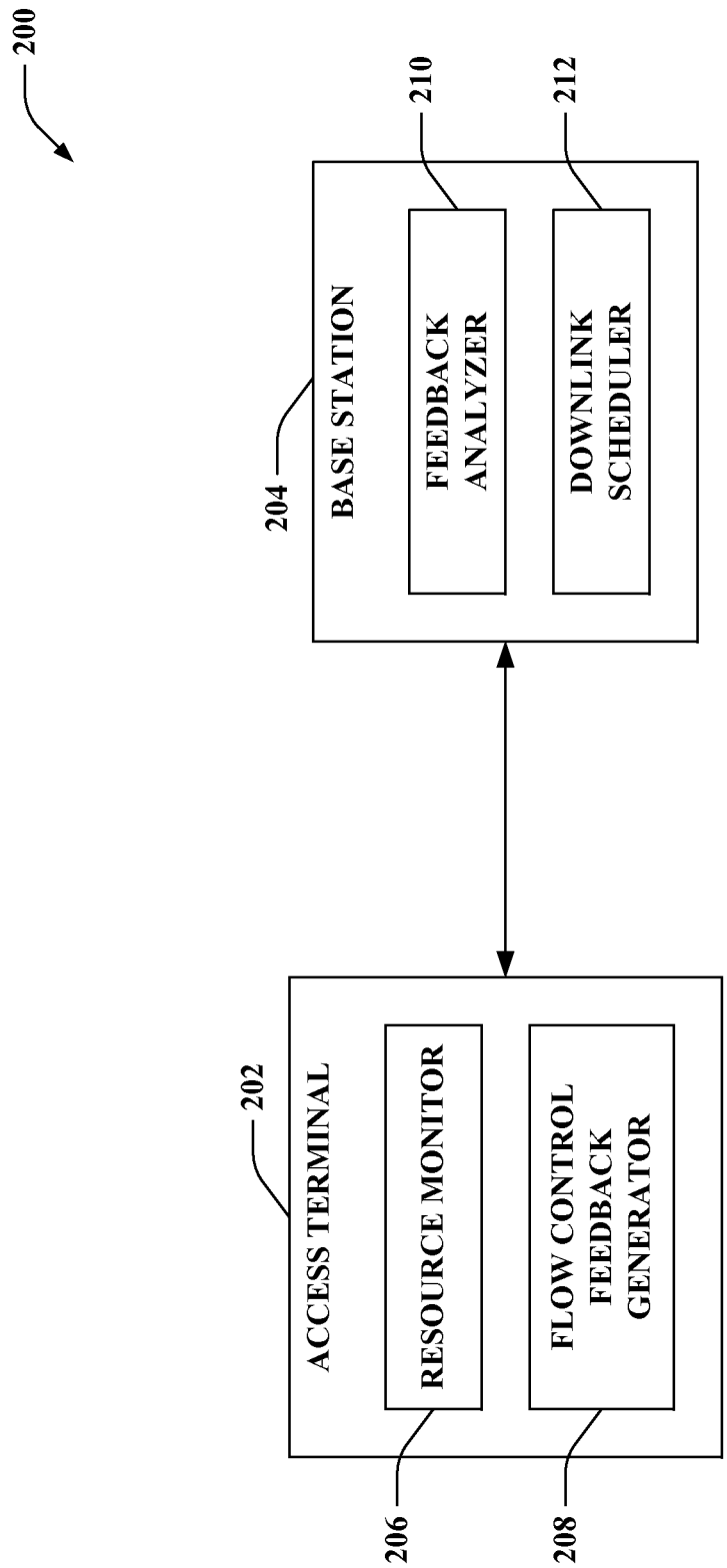
FIG. 2 is an illustration of an example system that utilizes downlink flow control in a wireless communication environment.

Referring to FIG. 2, illustrated is a system 200 that utilizes downlink flow control in a wireless communication environment. System 200 includes an access terminal 202 that can transmit and/or receive information, signals, data, instructions, commands, bits, symbols, and the like. Access terminal 202 can communicate with a base station 204 via the forward link and/or reverse link. Base station 204 can transmit and/or receive information, signals, data, instructions, commands, bits, symbols, and the like. Moreover, although not shown, it is contemplated that any number of access terminals similar to access terminal 202 can be included in system 200 and/or any number of base stations similar to base station 204 can be included in system 200.

Access terminal 202 further includes a resource monitor 206 and a flow control feedback generator 208. Resource monitor 206 can analyze utilization of resources of access terminal 202. For instance, the resources can relate to processing speed, processor cycles, battery power, buffer size, bus speed, and so forth. Resource monitor 206 can identify a congestion level encountered by access terminal 202. Thus, resource monitor 206 can recognize overloading of access terminal 202 such that access terminal 202 is unable to handle a current load (e.g., resource monitor 206 can determine that resources of access terminal 202 are insufficient to handle the current traffic received on the downlink, ... ). By way of illustration, resource monitor 206 can determine whether resource utilization is above or below a threshold (e.g., whether or not access terminal 202 is overloaded, ... ). According to another example, resource monitor 206 can determine a resource utilization level (e.g., percentage of use of one or more resources, resource monitor 206 can provide a more granular view of resource utilization, ... ).

Flow control feedback generator 208 can employ resource utilization information identified by resource monitor 206 to yield feedback that can be sent to base station 204 to alter downlink throughput. By way of example, resource monitor 206 can detect an overload condition, and based thereupon, flow control feedback generator 208 can output flow control feedback, which can be transmitted to base station 204 to request downlink throughput adjustment. Further, resource monitor 206 can recognize that resources of access terminal 202 are not overloaded; hence, flow control feedback generator 208 can yield corresponding feedback that can be sent to base station 204. Moreover, flow control feedback generator 208 can provide feedback as a function of capabilities of access terminal 202. The flow control feedback generated by flow control feedback generator 208 can be utilized to induce changes in downlink throughput allocated by base station 204 to access terminal 202.

It is to be appreciated that employment of various types of flow control feedback is intended to fall within the scope of the hereto appended claims. For instance, the flow control feedback yielded by flow control feedback generator 208 can leverage utilization of control protocol data units (PDUs). Pursuant to another example, flow control feedback generator 208 can employ Channel Quality Indicator (CQI) reports to send flow control feedback to base station 204.

Base station 204 can receive the flow control feedback from access terminal 202 (as well as flow control feedback from any disparate access terminal(s) (not shown) similar to access terminal 202 served by base station 204). Base station 204 can include a feedback analyzer 210 that reviews the obtained flow control feedback. Feedback analyzer 210 can decode the flow control feedback to recognize whether access terminal 202 has requested adjustment of downlink throughput. According to another example, feedback analyzer 210 can evaluate the flow control feedback to identify an amount of downlink throughput adjustment requested by access terminal 202. Pursuant to a further example, feedback analyzer 210 can recognize capabilities associated with access terminal 202 based upon review of the flow control feedback from access terminal 202.

Further, base station 204 can include a downlink scheduler 212 that alters downlink throughput allotted to access terminal 202 based upon the evaluation of the flow control feedback yielded by flow control feedback generator 208 of access terminal 202. Similarly, downlink scheduler 212 can adjust downlink throughput allocated to any disparate, served access terminal(s). For instance, flow control can be sticky such that a command received by base station 204 can be utilized to retain downlink throughput level allocated by downlink scheduler 212 for access terminal 202 as long as no other command is received from access terminal 202 (e.g., the downlink throughput remains in an updated state until obtaining a subsequent command, ... ). By way of another example, flow control can be temporary such that a command is valid for a period of time, and downlink scheduler 212 can adjust the downlink throughput to a default rate (e.g., full rate, ... ) upon expiration of the period of time associated with the command (e.g., the downlink throughput returns to an original state from the updated state after expiration of the period of time, ... ). Moreover, it is contemplated that flow control can be sticky or temporary depending on an application being effectuated by access terminal 202 and/or base station 204.

According to an example, it is contemplated that flow control feedback generator 208 (or access terminal 202 generally) can control a rate of flow control. Following this example, to limit utilization of the uplink for sending flow control commands, upper layers can configure a timer that can disallow access terminal 202 from sending a flow control command prior to expiration of the timer (e.g., creating a minimum time duration between adjacent flow control command transmissions by access terminal 202, ... ). Pursuant to a further illustration, flow control feedback generator 208 can allow a maximum number of flow control commands to be sent from access terminal 202 per unit of time.

Various flow control schemes are described herein. It is to be appreciated that any of these schemes can be employed, a combination of two or more of these schemes can be utilized, and so forth. An illustration of a flow control scheme that can be utilized by system 200 leverages employing hybrid automatic repeat request (HARQ) negative acknowledgements (NACKs). In this scheme, when resources of access terminal 202 run low (e.g., as determined by resource monitor 206, . . . ), flow control feedback generator 208 can generate and send a HARQ NACK on the uplink to NACK downlink HARQ packets that are correctly received. By NACKing a first HARQ transmission regardless of whether the packet is correctly received, a downlink throughput can be reduced by half. Further, by NACKing a first HARQ and a second HARQ transmission for each packet regardless whether the packet is correctly received, the downlink throughput can be reduced to one-third. It is contemplated that any number of NACKs can be sent by flow control feedback generator 208 in response to each received packet. Further, it is to be appreciated that the claimed subject matter is not limited to the aforementioned example.

Figure 3:
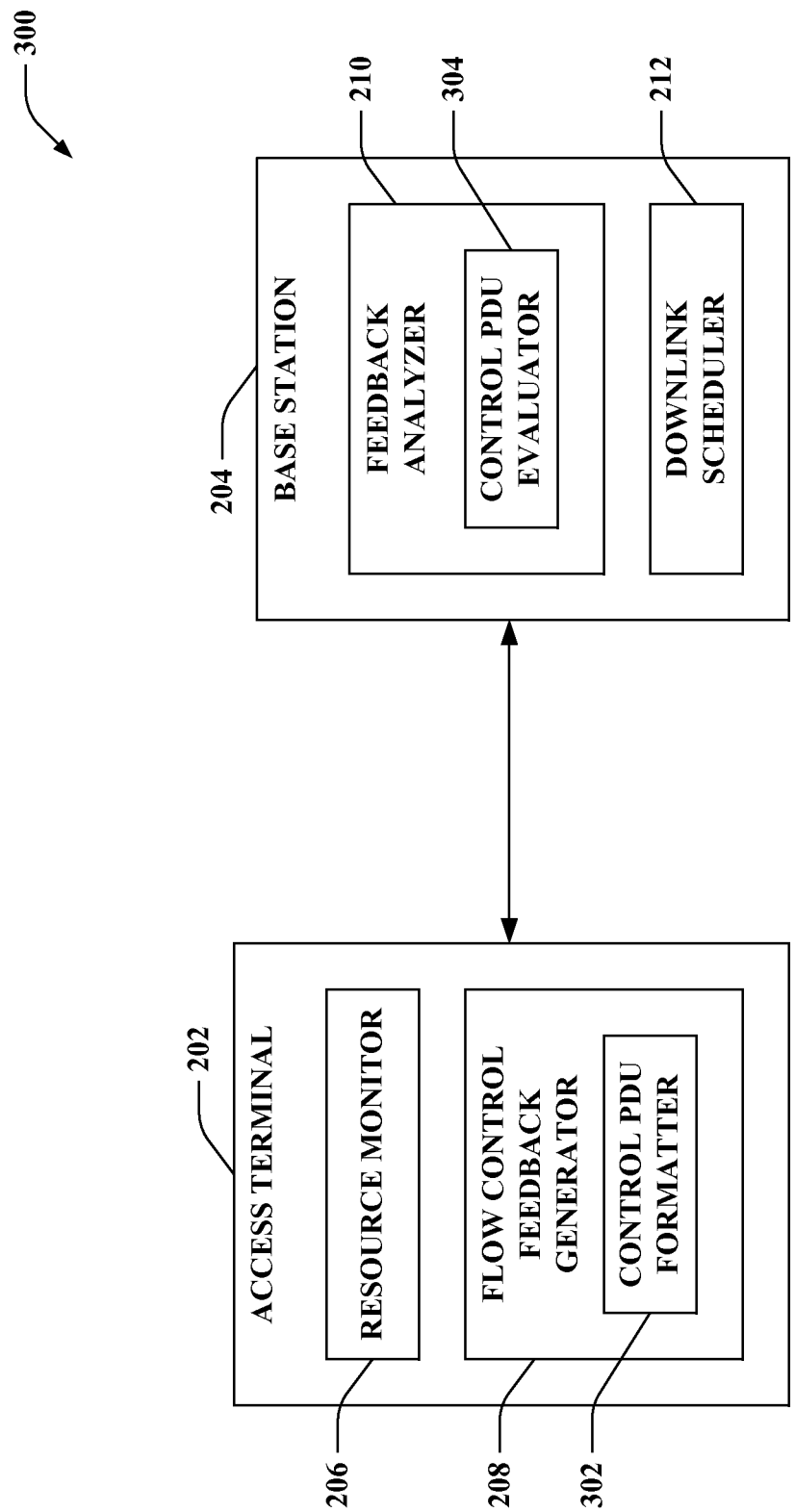
FIG. 3 is an illustration of an example system that utilizes control PDUs for providing flow control feedback in a wireless communication environment.

Turning to FIG. 3, illustrated is a system 300 that utilizes control PDUs for providing flow control feedback in a wireless communication environment. System 300 includes access terminal 202, which can further comprise resource monitor 206 and flow control feedback generator 208. System 300 can also include base station 204, which can further comprise feedback analyzer 210 and downlink scheduler 212. Flow control feedback generator 208 can further include a control PDU formatter 302 that generates a control PDU as a function of resource utilization for transmission to base station 204. Control PDU formatter 302, for example, can select a type of control PDU from a set of possible control PDU types, set a value within the control PDU, a combination thereof, and so forth. Further, feedback analyzer 210 of base station 204 can further include a control PDU evaluator 304 that can recognize a type of a received control PDU, a value within the received control PDU, a combination thereof, etc. Moreover, control PDU evaluator 304 can determine a downlink data rate change to effectuate (e.g., with downlink scheduler 212, . . . ) as a function of the recognized type, value, combination thereof, and the like. It is contemplated that system 300 can utilize a Media Access Control (MAC) control PDU, a Packet Data Convergence Protocol (PDCP) control PDU, a combination thereof, etc. for providing feedback from access terminal 202 to base station 204; however, the claimed subject matter is not so limited.

MAC-based flow control can be employed by system 300. For example, MAC control PDU type can be utilized to provide feedback concerning availability and/or utilization of resources of access terminal 202. Pursuant to an illustration, two types of MAC control PDUs (e.g., type 1 MAC control PDU and type 2 MAC control PDU, . . . ) can be defined to yield flow control feedback. Accordingly, when resource monitor 206 recognizes that resources of access terminal 202 run low (e.g., high level of resource utilization, . . . ), control PDU formatter 302 can select a first type of MAC control PDU (e.g., type 1 MAC control PDU, . . . ) that can be sent to base station 204 indicating that its resources are low. Further, when resource monitor 206 identifies that resource utilization for access terminal 202 is back to normal, control PDU formatter 302 can choose a second type of MAC control PDU (e.g., type 2 MAC control PDU, . . . ) that can be transmitted to base station 204 indicating that its resource utilization is back to normal.

In response to the MAC control PDU type detected by control PDU evaluator 304, reaction by base station 204 can be effectuated. Following the above example, when control PDU evaluator 304 recognizes that access terminal 202 sent a type 1 MAC control PDU, downlink scheduler 212 can react by reducing downlink data flow for access terminal 202. Moreover, when control PDU evaluator 304 determines that access terminal 202 transmitted a type 2 MAC control PDU, downlink scheduler 212 can react by increasing the downlink data flow for access terminal 202.

Below are additional example MAC-based flow control schemes. In these schemes, base station 204 can have control of which downlink flow(s) to modulate. For instance, alteration of rate(s) of downlink flow(s) can be based upon Quality of Service (QoS) attributes of the flows (e.g., flows with prioritized bit rate (PBR) configured typically should not be flow controlled, . . . ). Further, while the examples herein describe using MAC-based flow control for access terminal 202 to control a downlink rate, it is also envisioned that such flow control can apply to peer-to-peer links where a transmitter and a receiver can both be access terminals; however, the claimed subject matter is not so limited. Moreover, flow control can be applicable on an uplink using unscheduled channels.

According to an illustration, an on-off MAC-based flow control scheme can be employed by system 300. In this scheme, a type 1 MAC control PDU can include a binary value (e.g., either '0' or '1'), which can be set by control PDU formatter 302 and deciphered by control PDU evaluator 304 (e.g., one type of MAC control PDU can be defined to be employed with the on-off MAC-based flow control scheme, . . . ). When resources of access terminal 202 run low (e.g., resource utilization above a threshold, . . . ), control PDU formatter 302 can set the binary value of the type 1 MAC control PDU to '0'; thereafter, this type 1 MAC control PDU with the binary value set to '0' can be sent to base station 204. When base station 204 receives this MAC control PDU, control PDU evaluator 304 can recognize that the binary value is set to '0'. Further, control PDU evaluator 304 can control downlink scheduler 212 to stop transmitting downlink data to access terminal 202 (except for flows configured with a prioritized bit rate (PBR)). Similarly, when the resource utilization of access terminal 202 returns to normal (e.g., resource utilization below a threshold, . . . ), control PDU formatter 302 can generate a type 1 MAC control PDU with a binary value '1', which can be sent to base station 204. When base station 204 receives this MAC control PDU, control PDU evaluator 304 can recognize that the binary value is set to '1'. Further, control PDU evaluator 304 can cause downlink scheduler 212 to resume downlink data transmission to access terminal 202.

By way of another example, an up-down MAC-based flow control scheme can be leveraged by system 300. Two types of MAC control PDUs (e.g., type 1 and type 2, . . . ) can be defined for use with this up-down scheme. In this scheme, the type 1 MAC control PDU can carry an integer k between 0 and N, where N can be an integer greater than or equal to k. Control PDU formatter 302 can use the MAC control PDU to module the downlink data rate. Assuming that resource monitor 206 computes an average downlink data rate experienced by access terminal 202 in a given time window to be q, then $q*(k/N)$ can be the downlink data rate preferred by access terminal 202. Base station 204 can also estimate an average downlink data rate for access terminal 202 as being q'. The estimate effectuated by base station 204 can be based on an amount of data served to access terminal 202 (e.g., as determined from downlink scheduler 212, . . . ) in a past given window (e.g., which may or may not differ from the window employed by access terminal 202, . . . ). The estimates yielded by access terminal 202 and base station 204 can, but need not, match (e.g., which can be sufficient for purposes of flow control, . . . ). An advantage associated with the foregoing is a limited need for standardization in order to support such features. Pursuant to further illustration, when base station 204 receives the type 1 MAC control PDU from access terminal 202, control PDU evaluator 304 can adjust the downlink data rate yielded by downlink scheduler 212 for access terminal 202 to be q'*(k/N). It is contemplated that the above data rates described herein with respect to the up-down MAC-based flow control scheme can refer to an aggregated downlink data rate for all flows without a PBR configured. Moreover, when resource monitor 206 determines that access terminal 202 can tolerate receiving a higher data rate, control PDU formatter 302 can yield a type 2 MAC control PDU that includes a value k to indicate that a desired throughput is q*(1+k/N). The type 2 MAC control PDU can be sent from access terminal 202 to base station 204, and control PDU evaluator 304 can analyze the value of k incorporated therein and adapt an average downlink data rate for access terminal 202 to be q'(1+k/N). The up-down MAC-based flow control scheme enables communication between access terminal 202 and base station 204 with a high granularity as to a congestion level experienced by access terminal 202, which in turn can smooth a transition from congestion to non-congestion for access terminal 202.

According to a further example, a scaled access terminal capability MAC-based flow control scheme can be implemented by system 300. The scaled access terminal capability MAC-based flow control scheme enables scaling downlink data rates based upon maximum capabilities of access terminal 202. In this scheme, a type 1 MAC control PDU can carry an integer between 0 and N. When resources of access terminal 202 run low (e.g., as recognized by resource monitor 206, ...), control PDU formatter 302 can yield a type 1 MAC control PDU for transmission with a value set to k, where q*(k/N) is an updated maximum data rate to be supported by capabilities of access terminal 202 and q is a previous maximum data rate supported by capabilities of access terminal 202 as indicated in prior access terminal capability signaling (e.g., as provided in a previously transmitted MAC control PDU sent by access terminal 202, ...). When base station 204 receives the type 1 MAC control PDU, control PDU evaluator 304 can adjust a downlink data rate employed by downlink scheduler 212 for access terminal 202 as if a maximum data rate supported by capabilities of access terminal 202 are equal to q*(k/N). Note that, in this case, access terminal 202 and base station 204 share a value of q since it was previously signaled by access terminal 202. Further, when access terminal 202 can tolerate receiving a higher data rate (e.g., as identified by resource monitor 206, ...), control PDU formatter 302 can generate a type 2 MAC control PDU, which can be sent to base station 204. This type 2 MAC control PDU can include a value k to indicate to base station 204 that the desired throughput is q(1+k/N). Control PDU evaluator 304 can thereafter adapt an average downlink data rate employed by downlink scheduler 212 for access terminal 202 to be q(1+k/N). Accordingly, downlink scheduler 212 can consider capabilities of access terminal 202, which can be enabled by allowing access terminal capabilities to become variable in downlink scheduler 212.

Further, PDCP-based flow control can be employed in system 300 where PDCP control PDUs can be used by access terminal 202 to flow control downlink rates. These schemes can allow access terminal 202 to flow control each flow independently with high precision. In contrast to utilization of a MAC control PDU for adjusting downlink data rates for an aggregate downlink flows as described herein, a PDCP control PDU can be used for altering a downlink rate associated with an individual flow. For instance, if two applications are being executed with access terminal 202 (e.g., file transfer using file transfer protocol (FTP) and web browsing, ...), each application can be associated with an individual flow. Further, control PDU formatter 302 can yield a first PDCP control PDU for controlling a downlink data rate associated with the first flow (e.g., corresponding to file transfer, ...) and/or a second PDCP control PDU for controlling a downlink data rate associated with the second flow (e.g., corresponding to web browsing, ...). Thus, pursuant to the above illustration, file transfer can be selectively delayed without impacting a downlink data rate used for web browsing.

According to an example, PDCP-based flow control can be employed where control PDU formatter 302 generates a PDCP control PDU that indicates a highest PDCP Sequence Number (SN) (e.g., the highest PDCP SN can be set to a value y, ...) that can be employed by base station 204 for access terminal 202. The PDCP control PDU yielded by control PDU formatter 302 can be sent to base station 204, and control PDU evaluator 304 can recognize the value set for the highest PDCP SN incorporated in the received PDCP control PDU. Additionally or alternatively, the PDCP control PDU can indicate a highest Count-C (e.g., Hyper Frame Number (HFN) plus PDCP SN, ...) that can be employed by base station 204 or a part of a Count-C (e.g., lower 16 bits, ...). Further, control PDU evaluator 304 can restrict base station 204 from sending PDCP PDUs with SN greater than y until a further PDCP control PDU is received from access terminal 202 allowing transmission of a PDU with a higher sequence number.

By way of a further illustration, a maximum number of PDCP PDUs allowed to be transmitted by base station 204 in each Transmission Time Interval (TTI) can be indicated in a PDCP control PDU by control PDU formatter 302. Thus, control PDU evaluator 304 can review this PDCP control PDU and restrict the maximum number of PDUs permitted to be sent by base station 204 to access terminal 202.

Another example PDCP-based flow control scheme that can be employed by system 300 leverages use of a PDCP control PDU transferred from access terminal 202 to base station 204 for switching an associated PDCP bearer on and/or off. In a further example PDCP-based flow control scheme, a PDCP control PDU can be utilized to indicate an average rate PDCP at which PDCP can transmit, which can be similar to the up-down MAC-based flow control scheme described herein.

Figure 4:
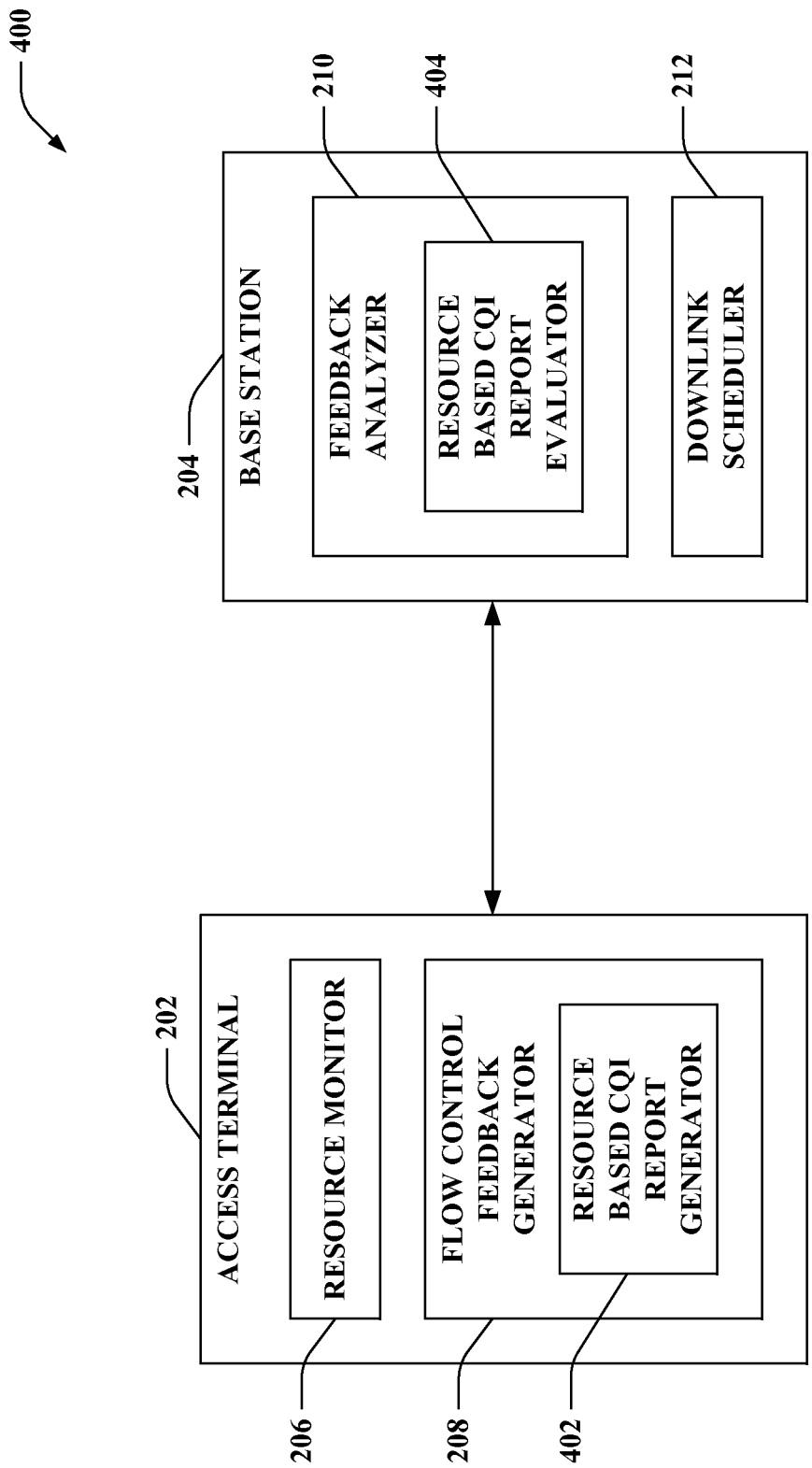
FIG. 4 is an illustration of an example system that employs Channel Quality Indicator (CQI)-based downlink flow control in a wireless communication environment.

Referring to FIG. 4, illustrated is a system 400 that employs Channel Quality Indicator (CQI)-based downlink flow control in a wireless communication environment. System 400 includes access terminal 202, which further comprises resource monitor 206 and flow control feedback generator 208. Flow control feedback generator 208 can include a resource based CQI report generator 402 that yields CQI reports that are leveraged to provide flow control feedback to base station 204, which can further include feedback analyzer 210 and downlink scheduler 212. Feedback analyzer 210 can include a resource based CQI report evaluator 404 that can analyze received CQI reports and perform downlink flow control based upon feedback recognized from the analysis of the received CQI reports.

According to an illustration, resource monitor 206 can detect an overload condition associated with access terminal 202. Based thereupon, resource based CQI report generator 402 can yield a predetermined code word (hereinafter the flow control code word) in a Channel Quality Indicator that is reserved for flow control. The flow control code word can be sent to base station 204. For example, the flow control code word can indicate to base station 204 to stop downlink traffic or reduce the data rate of traffic to access terminal 202. The traffic can be, for example, non-real time traffic or other types of traffic. Accordingly, access terminal 202 can detect an overload condition (e.g., determine that resources of access terminal 202 are insufficient to handle the current traffic received on the downlink) and can send flow control feedback to base station 204; base station 204 can react to the flow control feedback by reducing the throughput (e.g., when resources of access terminal 202 are low, . . . ) and increasing the throughput (e.g., when resources of access terminal 204 are normal, . . . ).

CQI can be used by access terminal 202 to report a downlink channel quality seen by access terminal 202 to base station 204. Dedicated resources in the physical layer are provided to report the CQI. For instance, 5-10 bits of the Physical Uplink Control Channel (PUCCH) can be used by access terminal 202 to report CQI to base station 204. According to an example CQI-based flow control scheme, one or more code words in the CQI code space can be reserved for flow control purposes. Thus, a reserved flow control code word, which can be a predetermined number of bits long (e.g., 5 bits long, . . . ), can be generated by resource based CQI report generator 402 and sent to base station 204. According to an illustration, two flow control code words in the CQI code space can be reserved for flow control purposes (e.g., the reserved values can indicate "no flow control" and "flow control", . . . ). Following this illustration, when resources of access terminal 202 run low, resource based CQI report generator 402 can yield a CQI report that includes the "flow control" value (e.g., a first flow control code word, . . . ), which can be sent to base station 204. Further, when resource utilization returns to a normal level (e.g., below a threshold, . . . ), resource based CQI report generator 402 can produce a CQI report that includes the "no flow control" value (e.g., a second flow control code word, . . . ).

By way of further example, the number of reserved flow control code words can be decreased by employing an "OFF" code word without an "ON" code word. The "OFF" command can expire after a period of time. Upon receipt of the reserved flow control code word (e.g., "OFF" code word, . . . ), resource based CQI report evaluator 404 can initiate a timer, wait a predetermined amount of time and then enable transmission of non-real time downlink traffic as scheduled by downlink scheduler 212. For example, since CQI can be allocated at a frequency of 50 Hz or greater, a single flow control code word that indicates "OFF" can be coupled with a 100 ms timer to provide control with decreased overhead as compared to employment of two or more reserved CQI flow control code words; however, it is to be appreciated that the claimed subject matter is not so limited.

According to another example where one flow control code word is employed, the flow control code word can be assigned to be the CQI value that indicates the worst channel conditions (e.g., the flow control code word can be assigned as "00000", . . . ). An advantage of such an assignment is that when the channel conditions are very poor, it is unlikely that flow control will be needed by access terminal 202. However, it is to be appreciated that any CQI value can be used (e.g., reserved, . . . ) for flow control code word(s).

When a reserved flow control code word is received by base station 204, resource based CQI report evaluator 404 can adapt the transmission rate employed by downlink scheduler 212. Pursuant to an example, access terminal 202 can mitigate sending CQI reports when a request to halt downlink transmission has been sent since access terminal 202 need not be employing the channel at such times.

According to another illustration, resource based CQI report generator 402 can indicate to reduce or stop non guaranteed bit rate (GBR) traffic, such as best effort traffic or non-real time traffic. Real time traffic (e.g., voice traffic, . . . ) can still be transmitted by base station 204. Further, it is noted that any number of flow control code words that are reserved to indicate flow control feedback can be utilized; however, as the number of flow control code words reserved for flow control feedback increases, the probability that these flow control code words can be decoded incorrectly by base station 204 (e.g., resource based CQI report evaluator 404, . . . ) can also increase.

Pursuant to a further illustration, predetermined CQI reporting intervals can be utilized for flow control reporting. For instance, a subset of CQI reporting intervals can be periodically reserved for flow control reporting. During the flow control reporting intervals, reserved flow control code words (e.g., with predetermined CQI value, . . . ) can be yielded by resource based CQI report generator 402, sent to base station 204, and analyzed by resource based CQI report evaluator 404, for example. By way of another illustration, resource dependent CQI values can be generated by resource based CQI report generator 402, transmitted to base station 204, and reviewed by resource based CQI report evaluator 404 to control downlink transmission. Moreover, measured CQI values (e.g., dependent upon channel conditions, . . . ) can be sent from access terminal 202 to base station 204 during CQI reporting intervals other than those utilized for flow control reporting.

Figure 5:
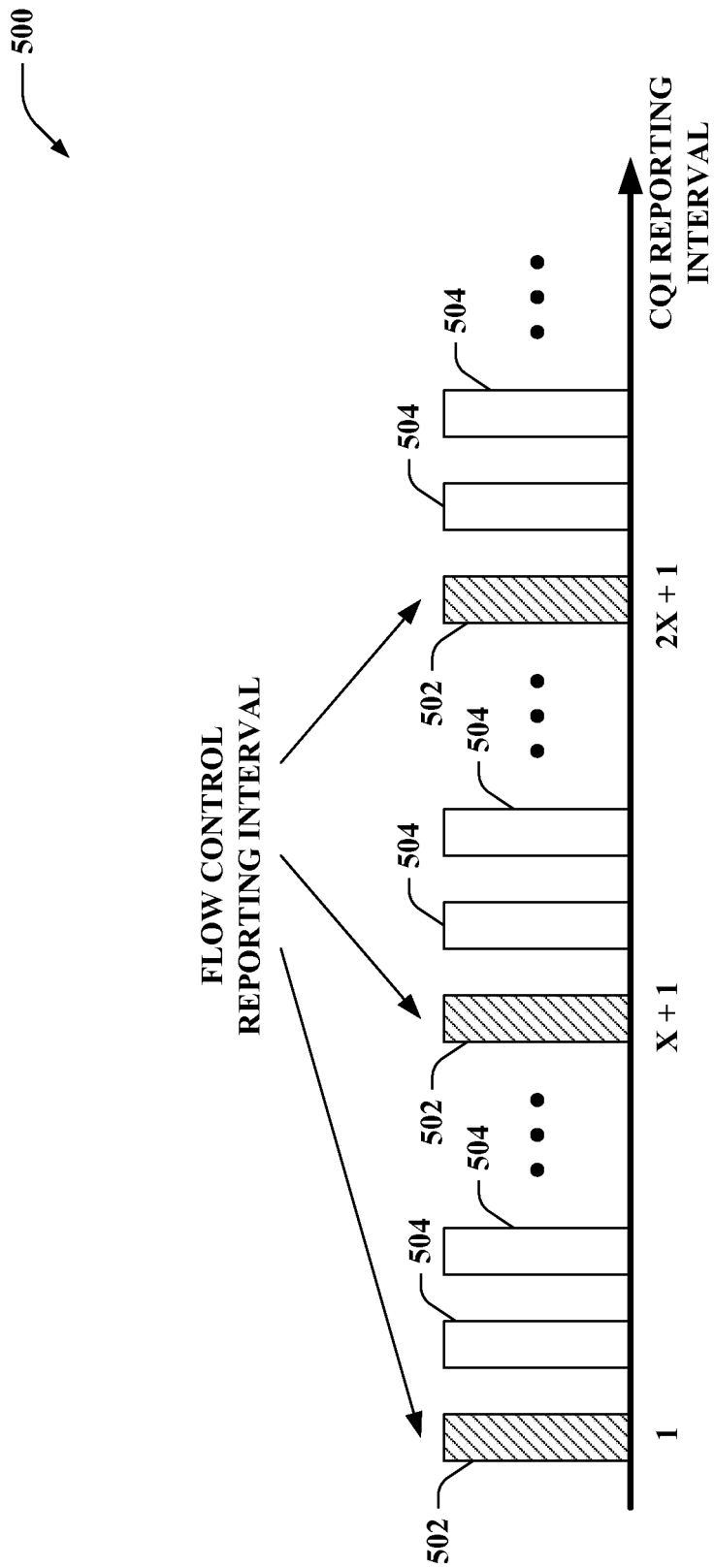
FIG. 5 is an illustration of an example timing diagram that depicts periodic flow control reporting that utilizes CQI values to provide feedback from an access terminal to a base station.

Now referring to FIG. 5, illustrated is an example timing diagram 500 that depicts periodic flow control reporting that utilizes CQI values to provide feedback from an access terminal to a base station. As shown, CQI reporting can be periodic. For instance, an access terminal can transmit a CQI report with substantially any periodicity (e.g., every 2 ms, 5 ms, 10 ms, . . . ). As illustrated in diagram 500, every X CQI reporting intervals can be utilized to provide flow control feedback, where X can be substantially any integer (e.g., X can be 10, . . . ); the CQI reporting intervals during which flow control feedback is transferred can be referred to as flow control reporting intervals 502. By way of example, at a predetermined time interval (e.g., every 100 ms, . . . ), an access terminal can generate and send a CQI report that carries flow control feedback and a base station can interpret such CQI report as carrying flow control feedback. It is to be appreciated, however, that the claimed subject matter is not limited to this example.

According to an example, the CQI value sent during one of the periodic flow control reporting intervals 502 can be interpreted as follows. A predetermined CQI value (e.g., reserved value(s) from the set of possible CQI values such as a lowest CQI value or an out-of-range value, . . . ) transferred during one of the flow control reporting intervals 502 can be interpreted as meaning that "the access terminal is congested and the base station needs to flow control the downlink now." Moreover, any other CQI value (e.g., non-reserved value included in the set of possible CQI values, . . . ) transferred during one of the flow control reporting intervals 502 can mean that the access terminal is not congested, and the reported CQI is the measured CQI that depends only on channel conditions. An advantage of this flow control technique is that no special CQI value is reserved for flow control, thereby the CQI resolution is not reduced. Further, the CQI reporting intervals other than the flow control reporting intervals (e.g., non-flow CQI reporting intervals 504, . . . ) can be utilized to send measured CQI values, which are dependent upon channel conditions.

By way of a further example, resource dependent CQI values, which differ from measured CQI values, can be transmitted during flow control reporting intervals 502 to indicate degree of access terminal congestion. A resource dependent CQI value is typically less than a measured CQI value. The measured CQI value is dependent only on the channel conditions and does not take into account access terminal processing limitations. Measured CQI values are reported during non-flow control reporting intervals 504.

Figure 6:
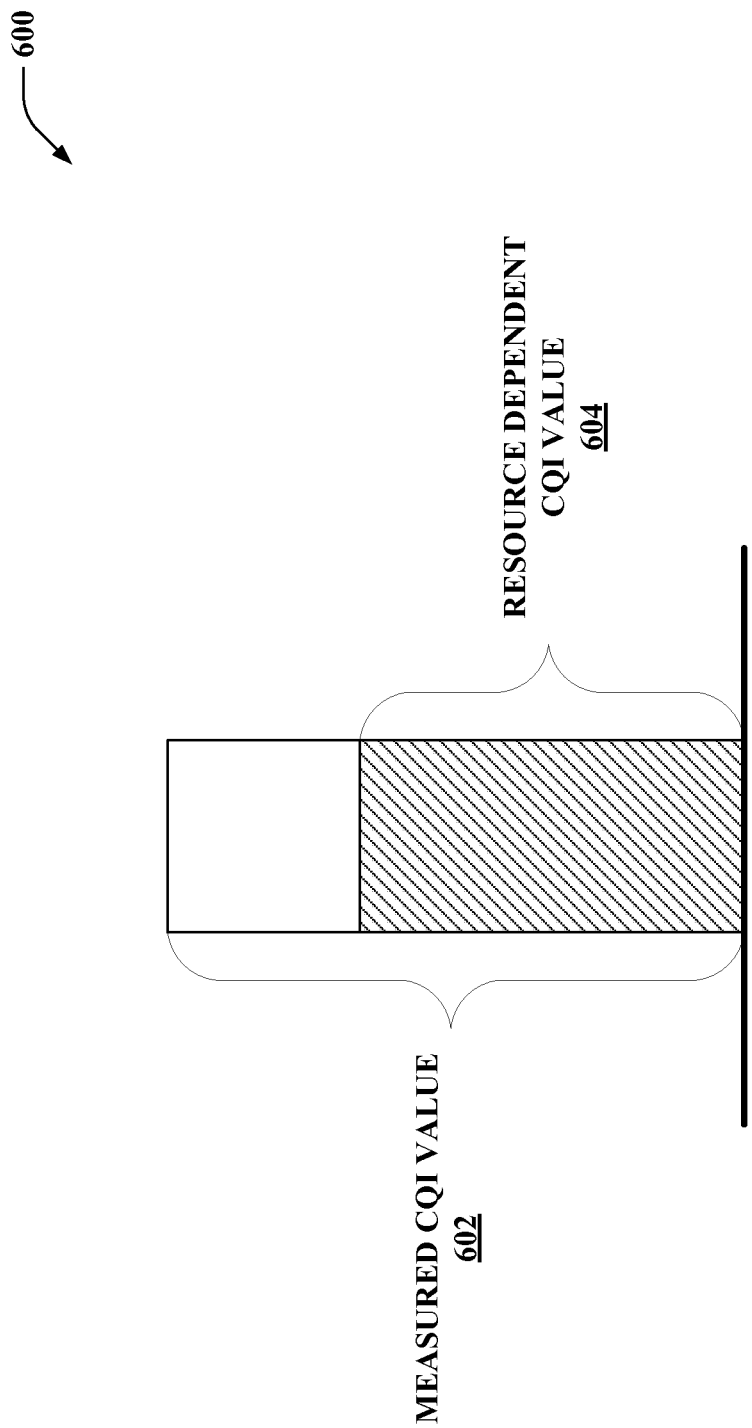
FIG. 6 is an illustration of an example comparison of a measured CQI value to a resource dependent CQI value.

The resource dependent CQI value (also referred to as a resource adjusted CQI value) reduces the measured CQI value to take into account limitations in access terminal resources (e.g., processing power, buffer space, battery life, . . . ). FIG. 6 illustrates an example comparison 600 of a measured CQI value 602 to a resource dependent CQI value 604. According to an illustration, when remaining space in a buffer of an access terminal is less than a predetermined value, a processor is operating at more than Y percent of a maximum utilization, or another metric indicates that the access terminal is congested, the access terminal can downwardly adjust measured CQI value 602 to generate resource dependent CQI value 604. Resource dependent CQI value 604 takes into account resource limitations of the access terminal. Further, resource dependent CQI value 604 can be reported during a flow control reporting interval (e.g., flow control reporting interval 502 of FIG. 5, . . . ). It is to be noted that if the access terminal is not congested, and flow control is not needed, then the access terminal need not report resource dependent CQI value 604; instead, the access terminal can report the measured CQI value 602 at the flow control reporting interval.

According to an example, the minimum of the resource dependent CQI value 604 and the measured CQI value 602 (e.g., channel dependent CQI, . . . ) is reported at every flow control reporting interval (e.g., flow control reporting intervals 502 of FIG. 5, . . . ). At all other CQI reporting intervals (e.g., non-flow control reporting intervals 504 of FIG. 5, . . . ), the measured CQI value 602 (e.g., channel dependent CQI, . . . ) is reported to the base station.

By way of another illustration, when there is no congestion (e.g., resource utilization below a threshold, . . . ) as monitored by the access terminal for a given flow control reporting interval (e.g., flow control reporting intervals 502 of FIG. 5, . . . ), the access terminal reports measured CQI value 602 to the base station. However, when there is congestion (e.g., resource utilization above a threshold, . . . ), the access terminal reports resource dependent CQI value 604, which is typically lower than measured CQI value 602, during the flow control reporting interval. At all other CQI reporting intervals (e.g., non-flow control reporting intervals 504 of FIG. 5, . . . ), the measured CQI value 602 (e.g., channel dependent CQI, . . . ) is reported to the base station.

In an example, the base station can receive a 5 bit CQI value from the access terminal and map the CQI value to a transfer block size, which is an indicator of a number of bits that can be sent in every TTI. An advantage of this embodiment is that the access terminal can indicate a degree of congestion so the base station knows how much to back off the downlink traffic. In contrast, the periodic CQI scheme that employs predetermined code words described above enables an access terminal to only say "I'm congested" without informing the base station as to how much congestion the access terminal is experiencing.

Referring to FIGS. 7-10, methodologies relating to controlling downlink data transmission rates based upon flow control feedback in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 7:
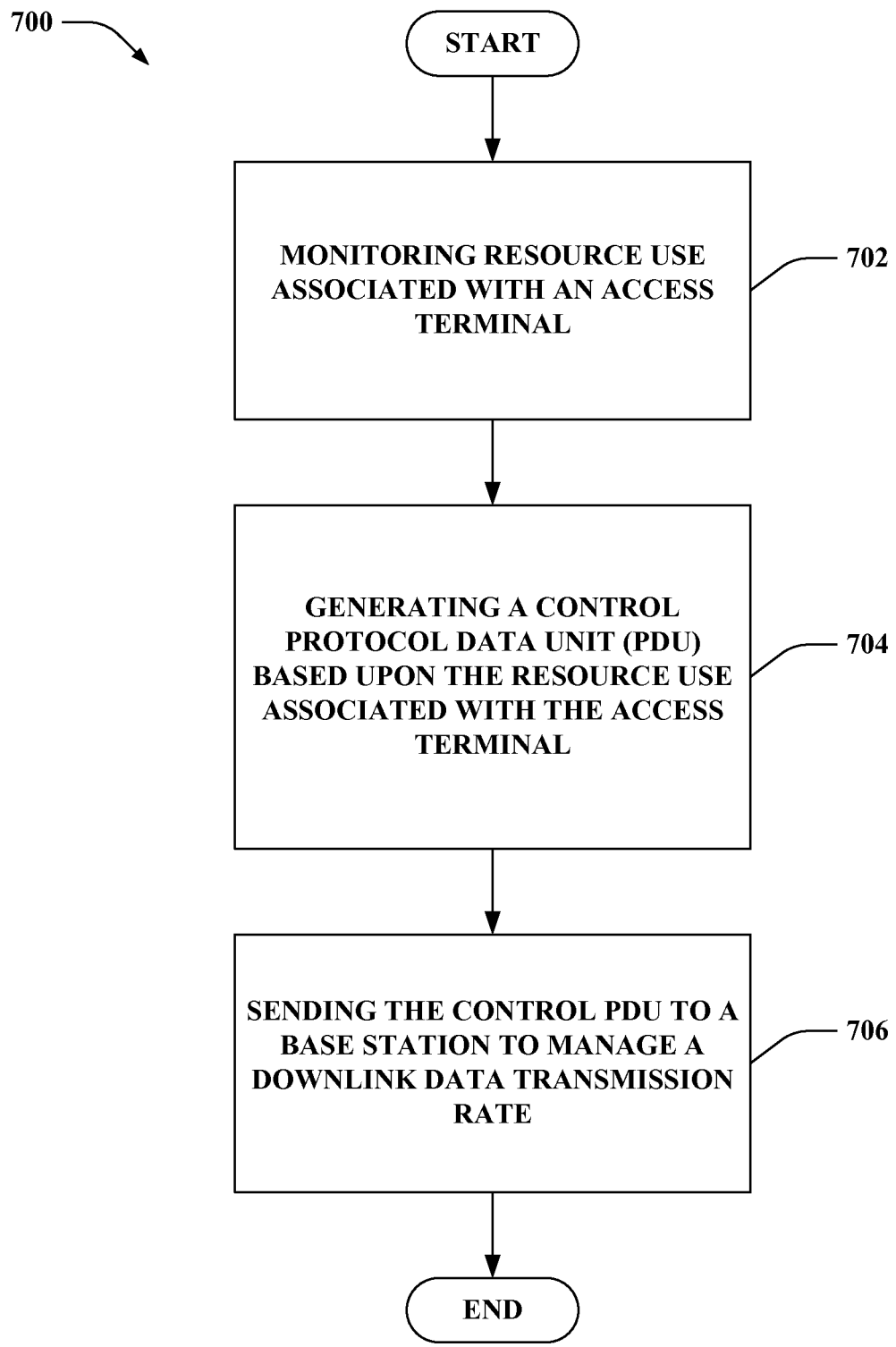
FIG. 7 is an illustration of an example methodology that facilitates providing downlink flow control in a wireless communication environment.

With reference to FIG. 7, illustrated is a methodology 700 that facilitates providing downlink flow control in a wireless communication environment. At 702, resource use associated with an access terminal can be monitored. For example, the resources can relate to processing speed, processor cycles, battery power, buffer size, bus speed, and so forth. The resource use can be compared to a threshold (e.g., determine whether the resource use is above or below the threshold, determined whether resources of the access terminal are sufficient or insufficient to handle a current traffic level received by the access terminal via the downlink, . . . ). Additionally or alternatively, the resource use can be monitored to recognize a percentage of an overall capacity being currently employed (e.g., the percentage can correspond to one or more resources associated with the access terminal, . . . ).

At 704, a control protocol data unit (PDU) can be generated based upon the resource use associated with the access terminal. The control PDU can be generated in accordance with one or more downlink flow control schemes. For instance, the control PDU can be a Media Access Control (MAC) control PDU, a Packet Data Convergence Protocol (PDCP) control PDU, a combination thereof, etc.

According to an example MAC-based flow control scheme, a type 1 MAC control PDU can be generated when resource use of the access terminal is determined to be above a first threshold, and a type 2 MAC control PDU can be generated when resource use of the access terminal is determined to be below a second threshold (e.g., the first threshold and the second threshold can be the same or different, . . . ). Following this example, the type 1 MAC control PDU can indicate to a base station that resource availability corresponding to the access terminal is below a given level, while the type 2 MAC control PDU can provide notification to the base station that resource availability corresponding to the access terminal is above the given level.

Pursuant to another example, an on-off MAC-based flow control scheme can be utilized. Accordingly, a type 1 MAC control PDU that includes a binary value set to 0 can be generated when resource use of the access terminal is determined to be above a first threshold, and a type 1 MAC control PDU that includes a binary value set to 1 can be generated when the resource use of the access terminal is determined to be below a second threshold (e.g., the first threshold and the second threshold can be the same or different, . . . ). Hence, setting the binary value to 0 can yield notification to a base station that resource availability related to the access terminal is below a given level. Further, setting the binary value to 1 can indicate to the base station that resource availability pertaining to the access terminal is above the given level.

By way of a further illustration, an up-down MAC-based flow control scheme can be employed. An average detected downlink data transmission rate experienced by the access terminal in a given time window can be determined (e.g., by the access terminal, . . . ). Moreover, a preferred downlink data transmission rate for the access terminal can be identified as a function of the monitored resource use (e.g., by the access terminal, . . . ). When the preferred downlink data transmission rate is less than the average detected downlink data transmission rate, then a type 1 MAC control PDU that includes a first selected value corresponding to a percentage decrease from the average detected downlink data transmission rate to the preferred downlink data transmission rate can be generated. Further, when the preferred downlink data transmission rate is greater than the average detected downlink data transmission rate, then a type 2 MAC control PDU that includes a second selected value corresponding to a percentage increase from the average detected downlink data transmission rate to the preferred downlink data transmission rate can be generated.

According to another example, a scaled access terminal capability MAC-based flow control scheme can be leveraged. Following this example, an updated downlink data transmission rate to be utilized by a base station for subsequent transmission for the access terminal can be determined based upon the monitored resource use. Further, the updated downlink data transmission rate can be compared to a previously signaled downlink data transmission rate to be utilized by the base station. When the updated downlink data transmission rate is less than the previously signaled downlink data transmission rate, then a type 1 MAC control PDU that includes a first selected value corresponding to a percentage decrease from the previously signaled downlink data transmission rate to the updated downlink data transmission rate can be generated. Moreover, when the updated downlink data transmission rate is greater than the previously signaled downlink data transmission rate, then a type 2 MAC control PDU that includes a second selected value corresponding to a percentage increase from the previously signaled downlink data transmission rate to the updated downlink data transmission rate can be generated.

By way of further example, a PDCP-based flow control scheme can be utilized. For instance, at least one of a PDCP control PDU that indicates a highest PDCP Sequence Number (SN), a highest Count-C which includes Hyper Frame Number (HFN) plus PDCP SN, or a part of a Count-C (e.g., lower 16 bits, ... ) permitted to be transmitted by a base station can be generated. According to another illustration, a PDCP control PDU that indicates a maximum number of PDCP PDUs allowed to be transmitted by the base station in a Transmission Time Interval (TTI) can be generated. Pursuant to a further illustration, a PDCP control PDU that switches an associated PDCP bearer between an on state and an off state can be generated. In accordance with another example, a PDCP control PDU that indicates an average rate at which PDCP can be transmitted by a base station can be generated.

At 706, the control PDU can be sent to a base station to manage a downlink data transmission rate. The control PDU can be transmitted on unscheduled uplink channels, for instance. Further, the downlink data transmission rate can be altered by the base station in response to the sent control PDU.

Figure 8:
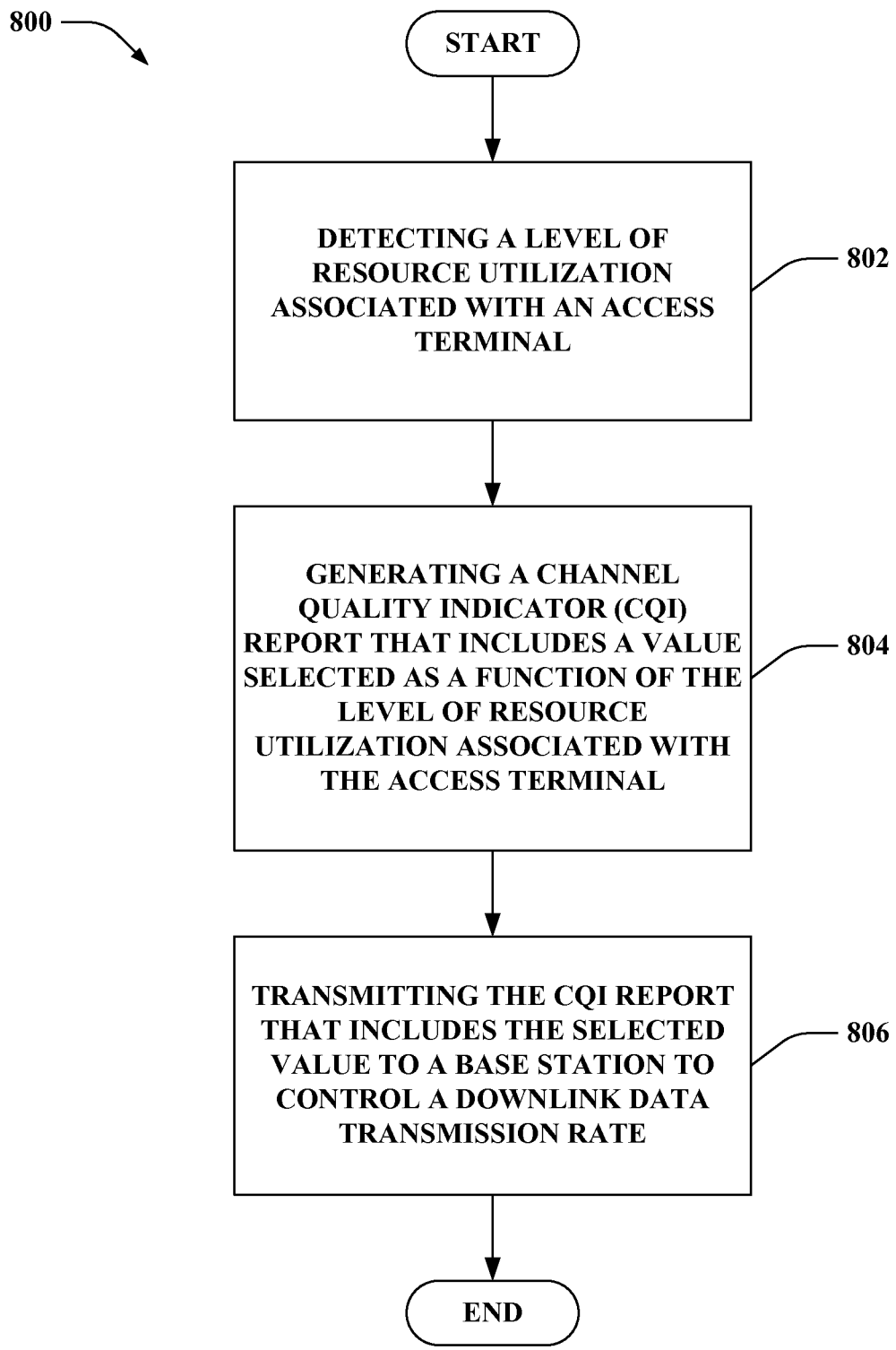
FIG. 8 is an illustration of another example methodology that facilitates providing downlink flow control in a wireless communication environment.

With reference to FIG. 8, illustrated is a methodology 800 that facilitates providing downlink flow control in a wireless communication environment. At 802, a level of resource utilization associated with an access terminal can be detected. For example, the resources can relate to processing speed, processor cycles, battery power, buffer size, bus speed, and so forth. The level of resource utilization can be compared to a threshold (e.g., determine whether the level of resource utilization is above or below the threshold, determined whether resources of the access terminal are sufficient or insufficient to handle a current traffic level received by the access terminal via the downlink, ... ). Additionally or alternatively, the level of resource utilization can be monitored to recognize a percentage of an overall capacity being currently employed (e.g., the percentage can correspond to one or more resources associated with the access terminal, ... ).

At 804, a channel quality indicator (CQI) report that includes a value selected as a function of the level of resource utilization associated with the access terminal can be generated. According to an example CQI-based flow control scheme, the value selected for inclusion in the CQI report can be a flow control code word that is reserved in CQI code space to indicate a level of flow control. For instance, two flow control code words can be reserved; a first one of these two flow control code words can be included in the CQI report to reduce (e.g., lower, stop, ... ) a downlink data transmission rate utilized by a base station for the access terminal, while the second one of these two flow control code words can be included in the CQI report to increase (e.g., raise, initiate, ... ) a downlink data transmission rate employed by the base station for the access terminal. Pursuant to another illustration, one flow control code word can be reserved; this flow control code word can be included in the CQI report to reduce (e.g., lower, stop, ... ) a downlink data transmission rate for a predetermined period of time. Upon expiration of the predetermined period of time, the downlink data transmission rate can increase (e.g., raise, initiate, return to a previously employed level, ... ).

By way of further example, a CQI-based flow control scheme can comprise generation of a CQI report that includes the value selected as a function of the level of resource utilization associated with the access terminal for transmission during a flow control reporting interval. A periodically occurring, predefined subset of CQI reporting intervals can be used for flow control reporting (e.g., every Xth CQI reporting interval can be a flow control reporting interval, where X can be substantially any integer, ... ). According to an example, during the flow control reporting interval, the value selected for inclusion in the CQI report can be a predetermined value when the level of resource utilization exceeds a threshold (e.g., the access terminal is recognized as being congested, ... ), and the value selected for inclusion in the CQI report can be a measured CQI value dependent upon channel conditions when the level of resource utilization is below the threshold (e.g., the access terminal is recognized as being not congested, ... ). Pursuant to a further example, during the flow control reporting interval, the value selected for inclusion in the CQI report can be a resource dependent CQI value, which is a measured CQI value dependent upon channel conditions reduced by a factor corresponding to the level of resource utilization, when the access terminal is recognized as being congested. Following this example, when the access terminal is not congested at a time period associated with this flow control reporting interval, the measured CQI value can be the value selected for inclusion in the CQI report. Further, the resource dependent CQI value can indicate a degree of access terminal congestion.

At 806, the CQI report that includes the selected value can be transmitted to a base station to control a downlink data transmission rate. The downlink data transmission rate can be adjusted by the base station in response to the transmitted CQI report.

Figure 9:
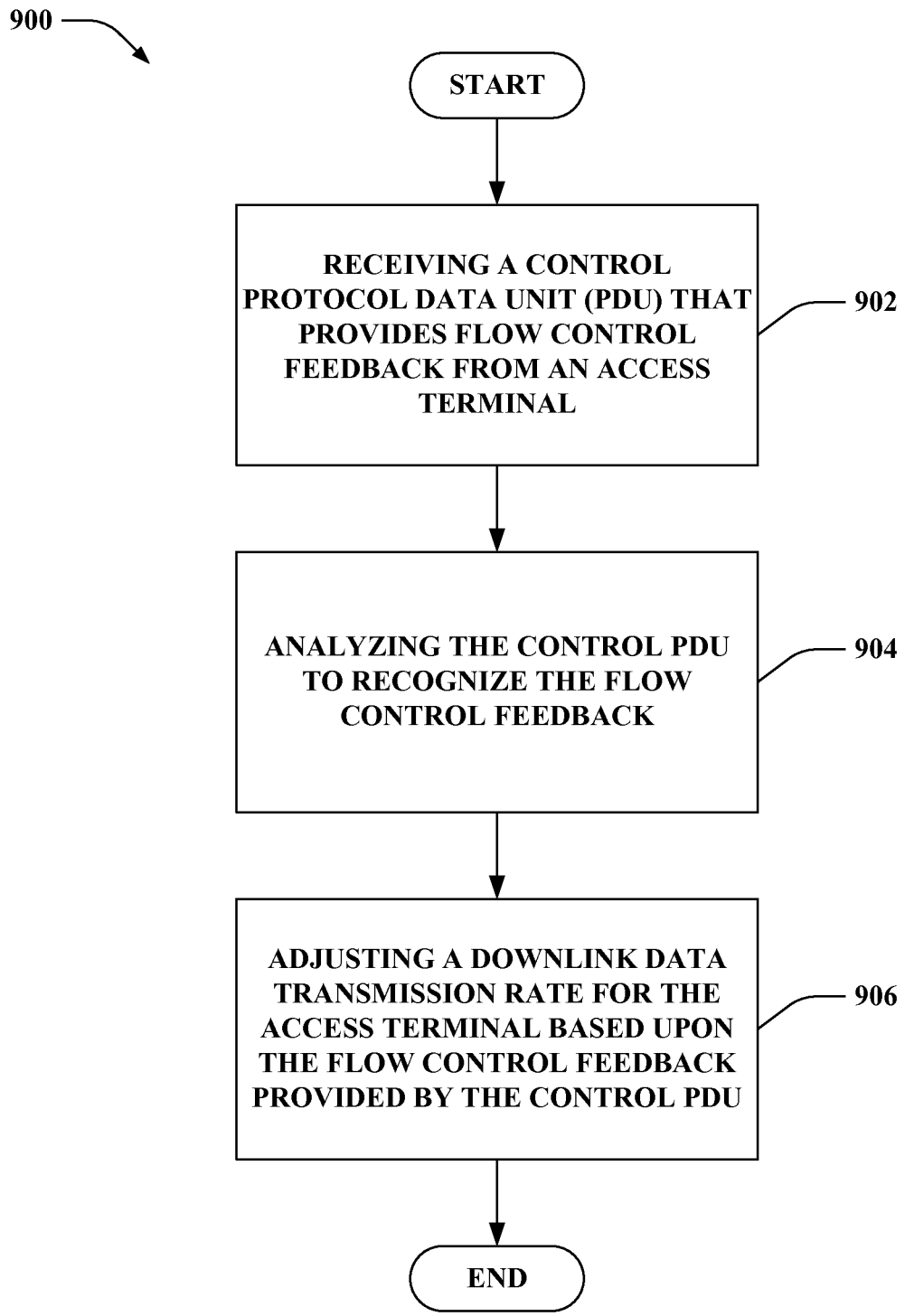
FIG. 9 is an illustration of an example methodology that facilitates controlling a downlink data transmission rate for an access terminal based upon flow control feedback from the access terminal in a wireless communication environment.

Now turning to FIG. 9, illustrated is a methodology 900 that facilitates controlling a downlink data transmission rate for an access terminal based upon flow control feedback from the access terminal in a wireless communication environment. At 902, a control protocol data unit (PDU) that provides flow control feedback can be received from an access terminal. The control PDU can be a MAC control PDU, a PDCP control PDU, or the like. At 904, the control PDU can be analyzed to recognize the flow control feedback. For instance, the type of control PDU (e.g., type 1 or type 2, . . . ), a value incorporated within the control PDU (e.g., a binary value, an integer value, . . . ), a combination thereof, etc. can be identified to determine the flow control feedback. At 906, a downlink data transmission rate for the access terminal can be adjusted based upon the flow control feedback provided by the control PDU. According to an illustration, downlink data transmission (e.g., except for flows configured with a prioritized bit rate (PBR), . . . ) can be started or stopped based upon the identified type of the control PDU or a binary value recognized as being included in the control PDU. Pursuant to a further example, the downlink data transmission rate can be increased or decreased based upon the identified type of the control PDU, and a percentage change (e.g., increase or decrease, . . . ) for the downlink data transmission rate can be recognized from an integer value determined to be included in the control PDU.

Figure 10:
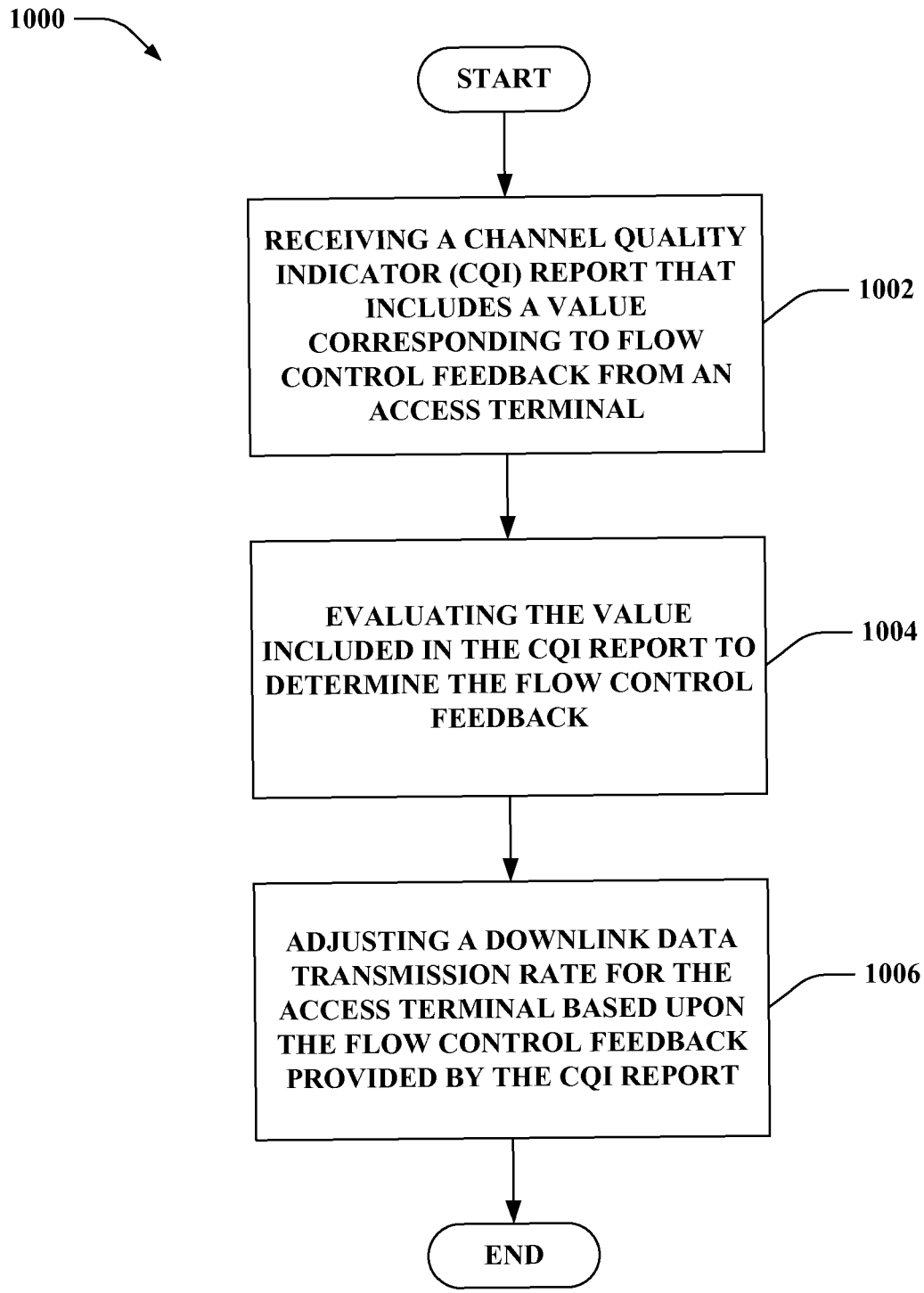
FIG. 10 is an illustration of an example methodology that facilitates utilizing flow control feedback to manage a downlink data transmission rate for an access terminal in a wireless communication environment.

Referring to FIG. 10, illustrated is a methodology 1000 that facilitates utilizing flow control feedback to manage a downlink data transmission rate for an access terminal in a wireless communication environment. At 1002, a channel quality indicator (CQI) report that includes a value corresponding to flow control feedback can be received from an access terminal. For instance, the CQI report that includes the value corresponding to the flow control feedback can be received during a predetermined flow control reporting interval (e.g., every Xth CQI reporting interval can be a flow control reporting interval, where X can be substantially any integer, . . . ) or during substantially any CQI reporting interval. At 1004, the value included in the CQI report can be evaluated to determine the flow control feedback. For example, the value can be recognized as a flow control code word that is reserved in CQI code space to indicate whether the access terminal is congested. According to another illustration, the value can be identified as a resource dependent CQI value. Further, the resource dependent CQI value can be reviewed to decipher a degree of congestion experienced by the access terminal. At 1006, a downlink data transmission rate for the access terminal can be adjusted based upon the flow control feedback provided by the CQI report. For instance, the adjusted downlink data transmission rate can be utilized until expiration of a timer, receipt of subsequent flow control feedback, a combination thereof, and the like.

It will be appreciated that, in accordance with one or more aspects described herein, inferences can be made regarding controlling downlink data transmission rates utilizing flow control feedback in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining trends in resource utilization of an access terminal. By way of further illustration, an inference can be made related to determining a change in resource utilization level associated with an access terminal that can result from an adjustment in downlink data transmission rate. It will be appreciated that the foregoing examples are illustrative in nature and are not intended to limit the number of inferences that can be made or the manner in which such inferences are made in conjunction with the various embodiments and/or methods described herein.

Figure 11:
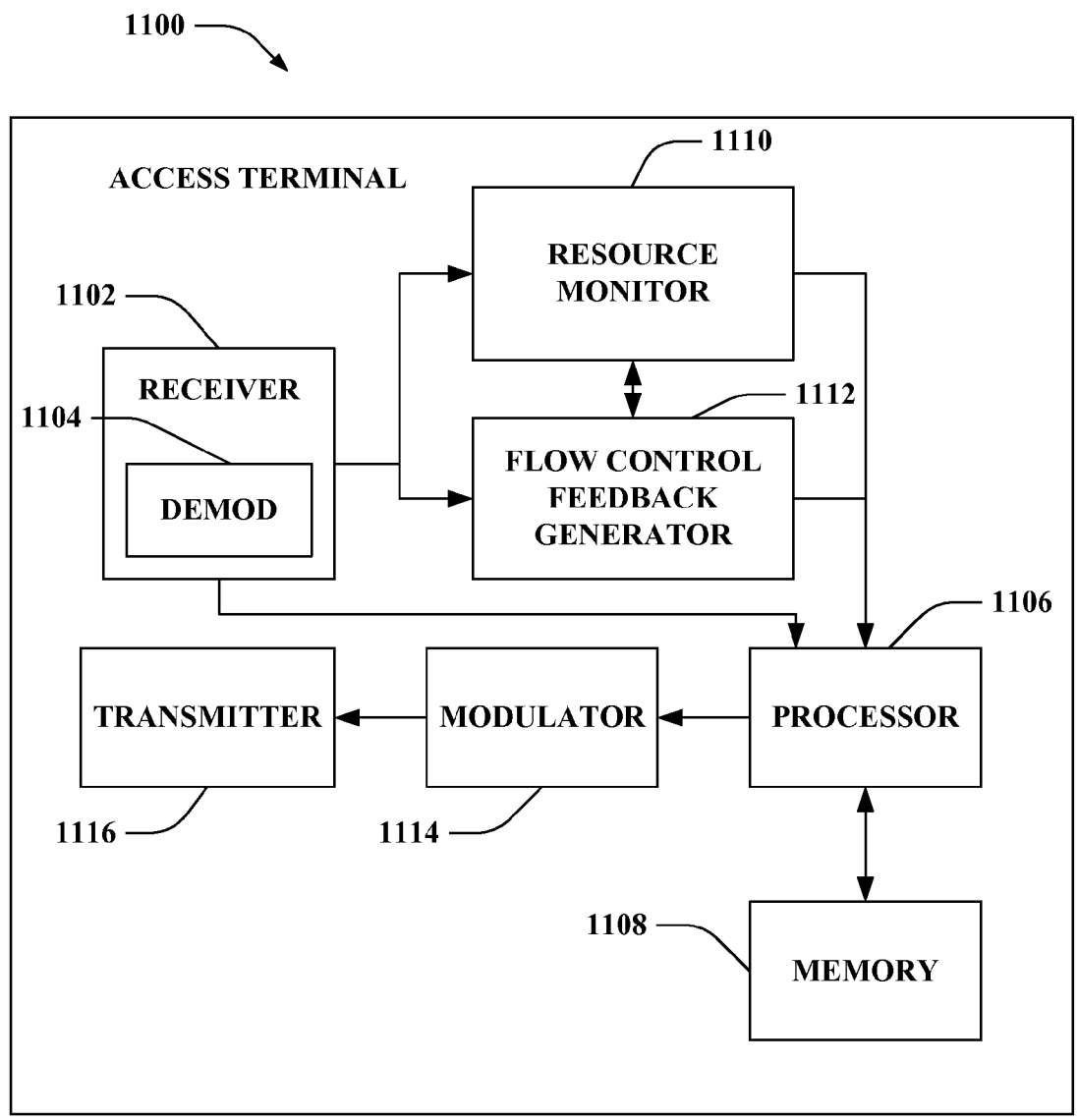
FIG. 11 is an illustration of an example access terminal that generates flow control feedback in a wireless communication system.

FIG. 11 is an illustration of an access terminal 1100 that generates flow control feedback in a wireless communication system. Access terminal 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of access terminal 1100, and/or a processor that both analyzes information received by receiver 1102, generates information for transmission by transmitter 1116, and controls one or more components of access terminal 1100.

Access terminal 1100 can additionally comprise memory 1108 that is operatively coupled to processor 1106 and that can store data to be transmitted, received data, and any other suitable information related to performing the various actions and functions set forth herein. Memory 1108, for instance, can store protocols and/or algorithms associated with monitoring utilization of resources associated with access terminal 1100. Further, memory 1108 can store protocols and/or algorithms for yielding flow control feedback that can be sent from access terminal 1100 over an uplink to a base station for controlling a downlink data transmission rate.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to a resource monitor 1110 and/or a flow control feedback generator 1112. Resource monitor 1110 can be substantially similar to resource monitor 206 of FIG. 2. Moreover, flow control feedback generator 1112 can be substantially similar to flow control feedback generator 208 of FIG. 2. Although not depicted, it is to be appreciated that flow control feedback generator 1112 can further include a control PDU formatter, which can be substantially similar to control PDU formatter 302 of FIG. 3, and/or a resource based CQI report generator, which can be substantially similar to resource based CQI report generator 402 of FIG. 4. Resource monitor 1110 can detect a level of resource utilization associated with access terminal 1100. For instance, resource monitor 1110 can determine whether or not access terminal 1100 is congested. Moreover, flow control feedback generator 1112 can generate flow control feedback that can be sent to a base station to control a downlink data transmission rate. By way of example, the flow control feedback yielded by flow control feedback generator 1112 can be a CQI report that includes a value selected as a function of the resource utilization associated with access terminal 1100. Pursuant to a further illustration, the flow control feedback yielded by flow control feedback generator 1112 can be a control PDU generated based upon the resource utilization associated with access terminal 1100. Access terminal 1100 still further comprises a modulator 1114 and a transmitter 1116 that transmits the flow control feedback to a base station (e.g., a serving base station, . . . ). Although depicted as being separate from the processor 1106, it is to be appreciated that resource monitor 1110, flow control feedback generator 1112 and/or modulator 1114 can be part of processor 1106 or a number of processors (not shown).

Figure 12:
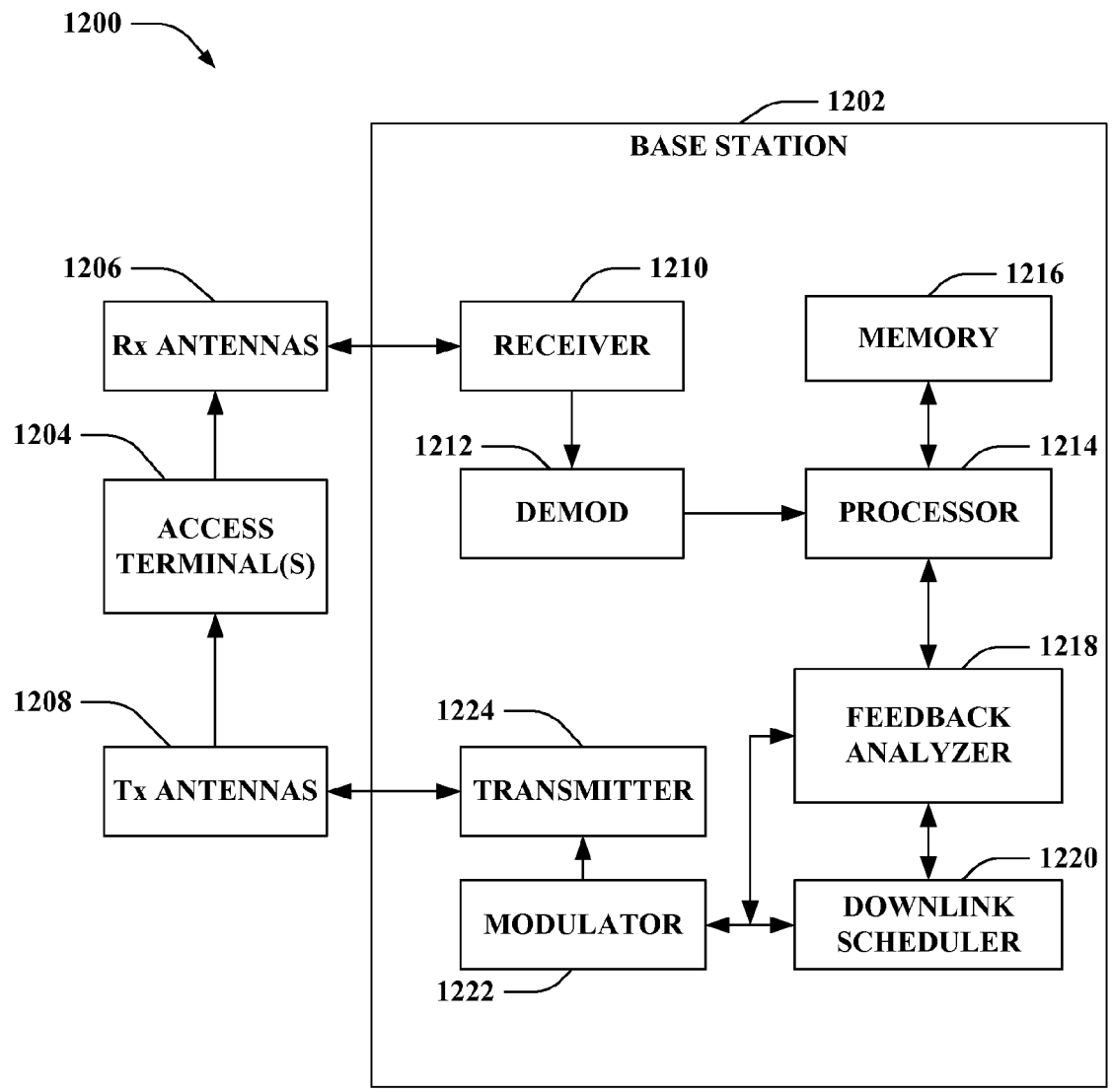
FIG. 12 is an illustration of an example system that utilizes obtained flow control feedback to manage a downlink data transmission rate in a wireless communication environment.

FIG. 12 is an illustration of a system 1200 that utilizes obtained flow control feedback to manage a downlink data transmission rate in a wireless communication environment. System 1200 comprises a base station 1202 (e.g., access point, . . . ) with a receiver 1210 that receives signal(s) from one or more access terminals 1204 through a plurality of receive antennas 1206, and a transmitter 1224 that transmits to the one or more access terminals 1204 through a transmit antenna 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores data to be transmitted to or received from access terminal(s) 1204 and/or any other suitable information related to performing the various actions and functions set forth herein. Processor 1214 is further coupled to a feedback analyzer 1218 that can evaluate flow control feedback received from access terminal(s) 1204. Moreover, base station 1202 can include a downlink scheduler 1220 that can adjust a downlink data transmission rate based upon the evaluated flow control feedback. It is contemplated that feedback analyzer 1218 can be substantially similar to feedback analyzer 210 of FIG. 2 and/or downlink scheduler 1220 can be substantially similar to downlink scheduler 212 of FIG. 2. Further, although not shown, it is to be appreciated that base station 1202 can further include a control PDU evaluator (e.g., which can be substantially similar to control PDU evaluator 304 of FIG. 3, . . . ) and/or a resource based CQI report evaluator (e.g., which can be substantially similar to resource based CQI report evaluator 404, . . . ). By way of further illustration, downlink scheduler 1220 can provide information to be transmitted to a modulator 1222. Modulator 1222 can multiplex a frame for transmission by a transmitter 1224 through antennas 1208 to access terminal(s) 1204. Although depicted as being separate from the processor 1214, it is to be appreciated that feedback analyzer 1218, downlink scheduler 1220, and/or modulator 1222 can be part of processor 1214 or a number of processors (not shown).

Figure 13:
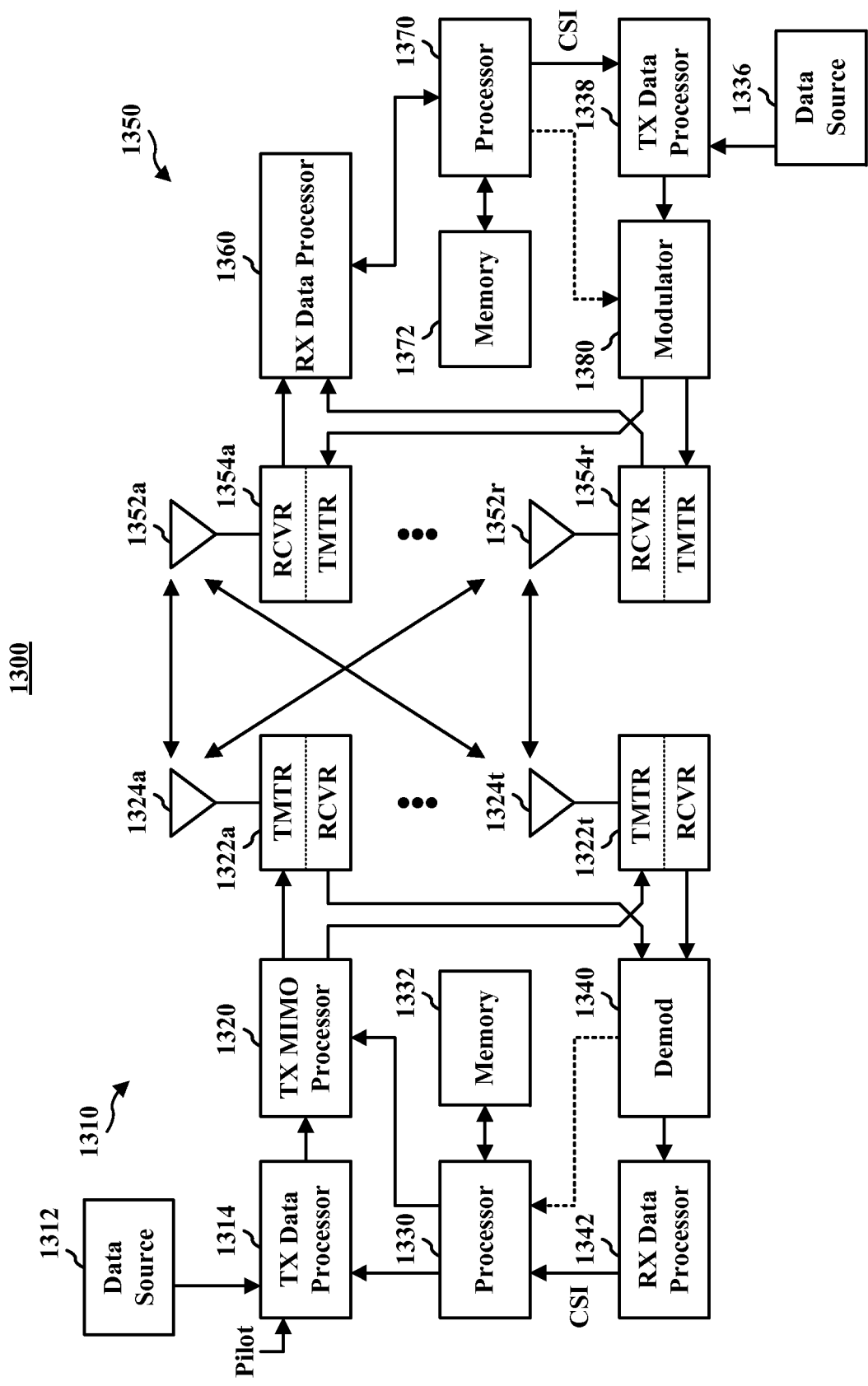
FIG. 13 is an illustration of an example wireless network environment that can be employed in conjunction with the various systems and methods described herein.

FIG. 13 shows an example wireless communication system 1300. The wireless communication system 1300 depicts one base station 1310 and one access terminal 1350 for sake of brevity. However, it is to be appreciated that system 1300 can include more than one base station and/or more than one access terminal, wherein additional base stations and/or access terminals can be substantially similar or different from example base station 1310 and access terminal 1350 described below. In addition, it is to be appreciated that base station 1310 and/or access terminal 1350 can employ the systems (FIGS. 1-4, 11-12, and 14-17) and/or methods (FIGS. 7-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At access terminal 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and down-converts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from access terminal 1350 are received by antennas 1324, conditioned by receivers 1322, demodulated by a demodulator 1340, and processed by a RX data processor 1342 to extract the reverse link message transmitted by access terminal 1350. Further, processor 1330 can process the extracted message to determine which precoding matrix to use for determining the beamforming weights.

Processors 1330 and 1370 can direct (e.g., control, coordinate, manage, etc.) operation at base station 1310 and access terminal 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ...) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
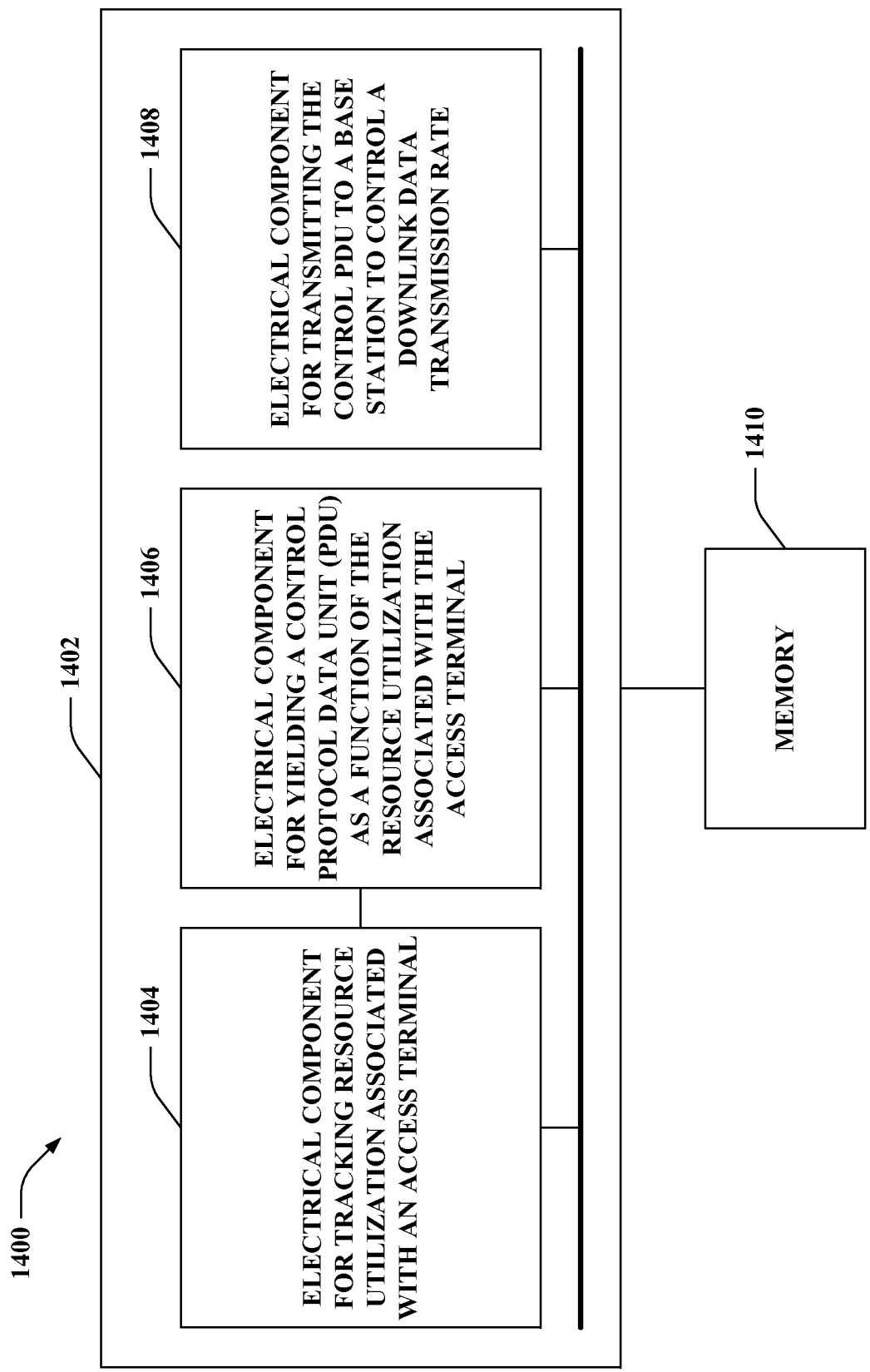
FIG. 14 is an illustration of an example system that enables providing flow control feedback to a base station using control protocol data units (PDUs) in a wireless communication environment.

With reference to FIG. 14, illustrated is a system 1400 that enables providing flow control feedback to a base station using control protocol data units (PDUs) in a wireless communication environment. For example, system 1400 can reside within an access terminal. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for tracking resource utilization associated with an access terminal 1404. Moreover, logical grouping 1402 can include an electrical component for yielding a control protocol data unit (PDU) as a function of the resource utilization associated with the access terminal 1406. Further, logical grouping 1402 can include an electrical component for transmitting the control PDU to a base station to control a downlink data transmission rate 1408. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Figure 15:
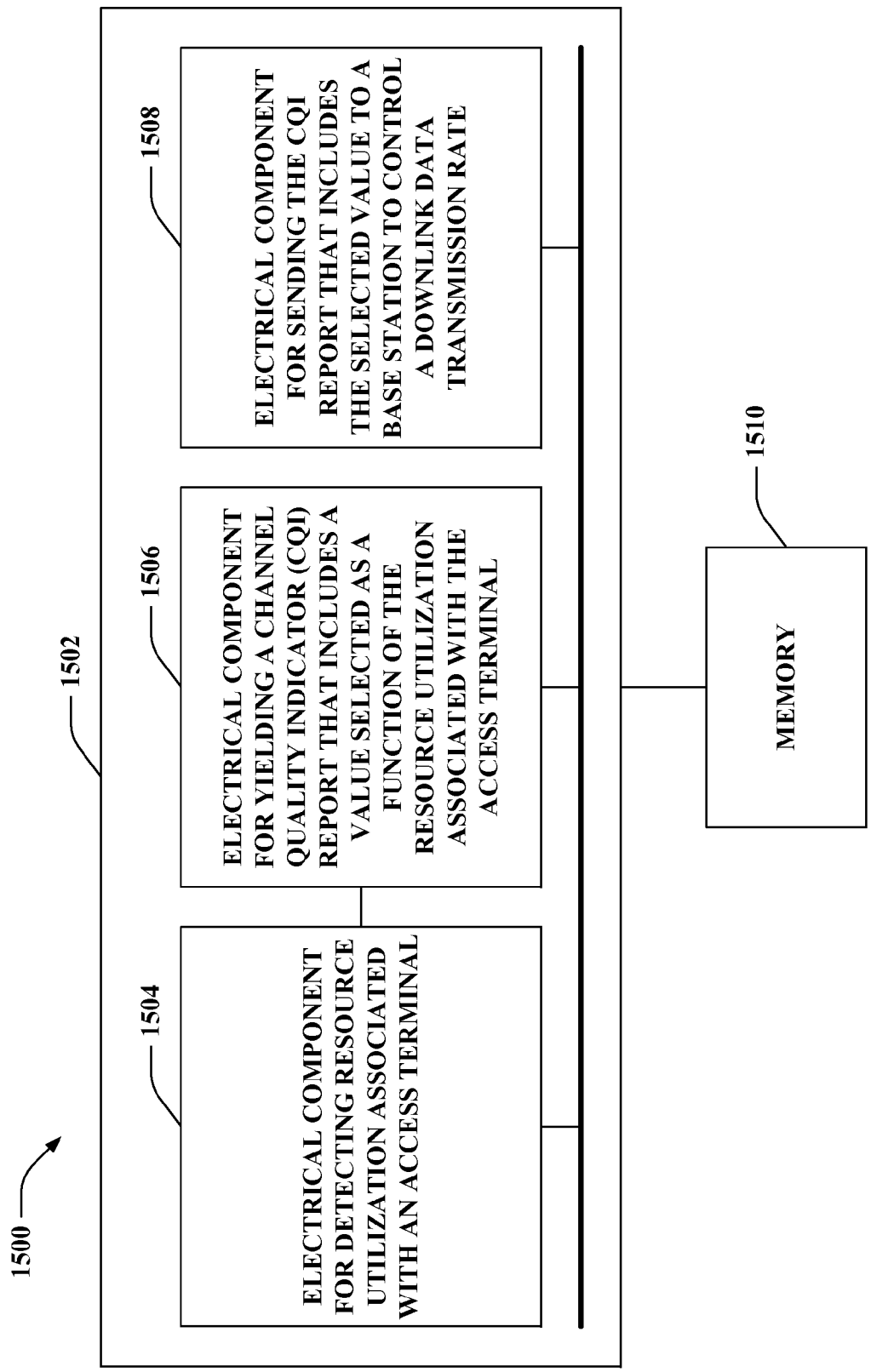
FIG. 15 is an illustration of an example system that enables yielding flow control feedback to a base station using channel quality indicator (CQI) reports in a wireless communication environment.

Turning to FIG. 15, illustrated is a system 1500 that enables yielding flow control feedback to a base station using channel quality indicator (CQI) reports in a wireless communication environment. System 1500 can reside within an access terminal, for instance. As depicted, system 1500 includes functional blocks that can represent functions implemented by a processor, software, or combination thereof (e.g., firmware). System 1500 includes a logical grouping 1502 of electrical components that can act in conjunction. Logical grouping 1502 can include an electrical component for detecting resource utilization associated with an access terminal 1504. Moreover, logical grouping 1502 can include an electrical component for yielding a channel quality indicator (CQI) report that includes a value selected as a function of the resource utilization associated with the access terminal 1506. Further, logical grouping 1502 can include an electrical component for sending the CQI report that includes the selected value to a base station to control a downlink data transmission rate 1508. Additionally, system 1500 can include a memory 1510 that retains instructions for executing functions associated with electrical components 1504, 1506, and 1508. While shown as being external to memory 1508, it is to be understood that electrical components 1504, 1506, and 1508 can exist within memory 1510.

Figure 16:
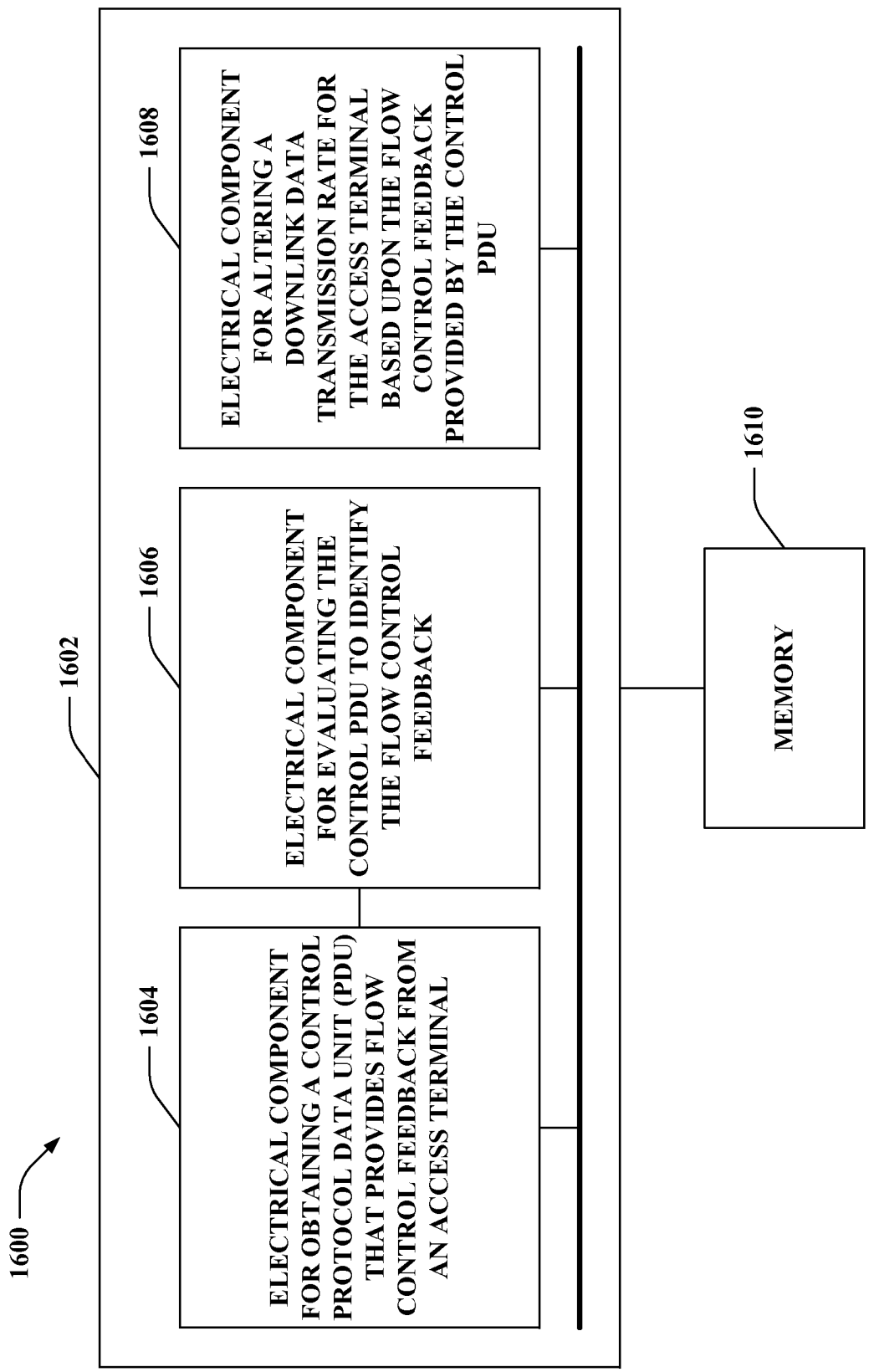
FIG. 16 is an illustration of an example system that enables adjusting a downlink data transmission rate utilizing flow control feedback in a wireless communication environment.

With reference to FIG. 16, illustrated is a system 1600 that enables adjusting a downlink data transmission rate utilizing flow control feedback in a wireless communication environment. For example, system 1600 can reside at least partially within a base station. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for obtaining a control protocol data unit (PDU) that provides flow control feedback from an access terminal 1604. Moreover, logical grouping 1602 can include an electrical component for evaluating the control PDU to identify the flow control feedback 1606. Further, logical grouping 1602 can include an electrical component for altering a downlink data transmission rate for the access terminal based upon the flow control feedback provided by the control PDU 1608. Additionally, system 1600 can include a memory 1610 that retains instructions for executing functions associated with electrical components 1604, 1606, and 1608. While shown as being external to memory 1610, it is to be understood that one or more of electrical components 1604, 1606, and 1608 can exist within memory 1610.

Figure 17:
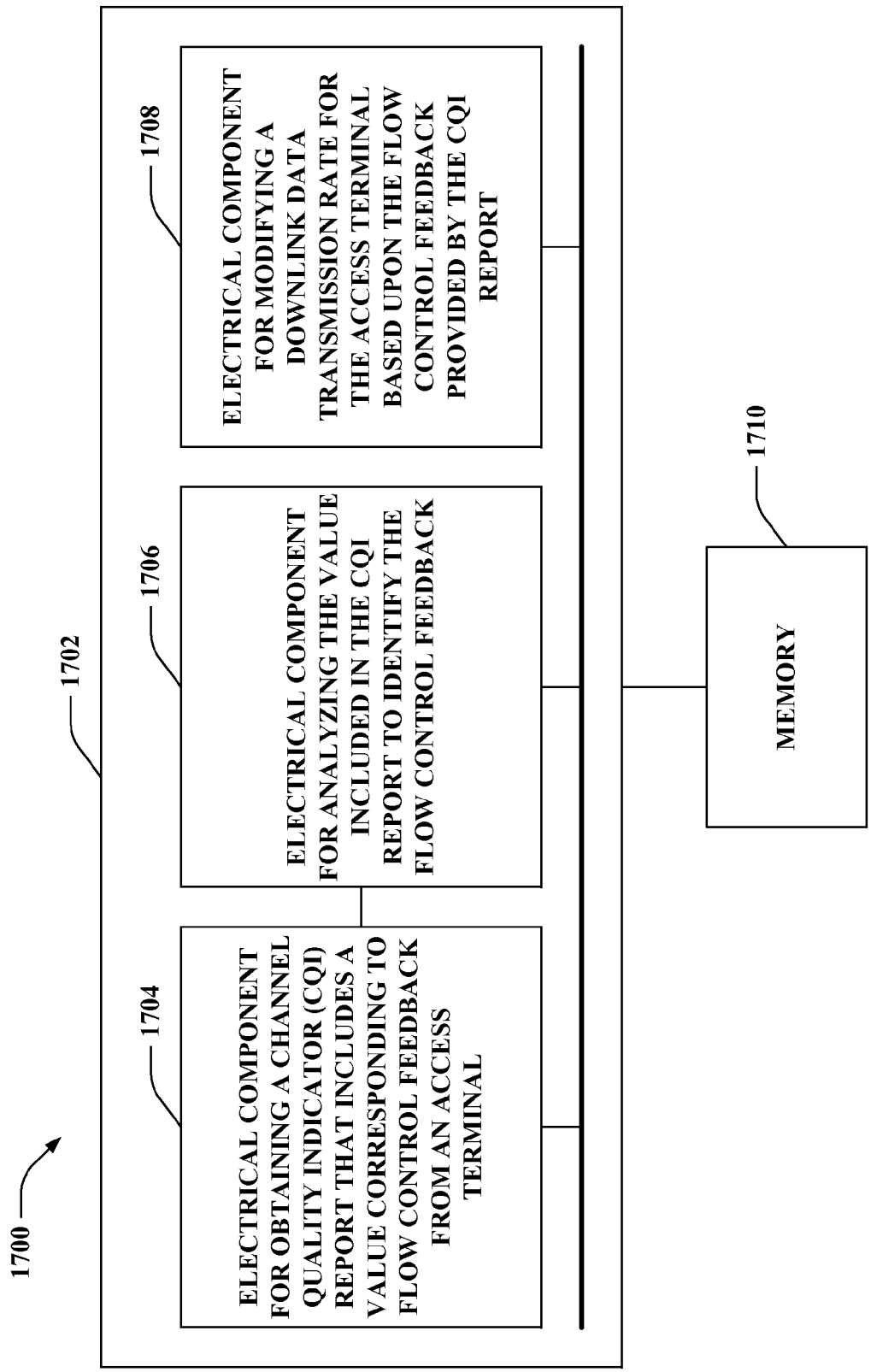
FIG. 17 is an illustration of an example system that enables altering a downlink data transmission rate employing flow control feedback in a wireless communication environment.

With reference to FIG. 17, illustrated is a system 1700 that enables altering a downlink data transmission rate employing flow control feedback in a wireless communication environment. For example, system 1700 can reside at least partially within a base station. It is to be appreciated that system 1700 is represented as including functional blocks, which can be functional blocks that represent functions implemented by a processor, software, or combination thereof (e.g., firmware). System 1700 includes a logical grouping 1702 of electrical components that can act in conjunction. For instance, logical grouping 1702 can include an electrical component for obtaining a channel quality indicator (CQI) report that includes a value corresponding to flow control feedback from an access terminal 1704. Further, logical grouping 1702 can include an electrical component for analyzing the value included in the CQI report to identify the flow control feedback 1706. Moreover, logical grouping 1702 can include an electrical component for modifying a downlink data transmission rate for the access terminal based upon the flow control feedback provided by the CQI report 1708. Additionally, system 1700 can include a memory 1710 that retains instructions for executing functions associated with electrical components 1704, 1706, and 1708. While shown as being external to memory 1710, it is to be understood that one or more of electrical components 1704, 1706, and 1708 can exist within memory 1710.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   detecting a level of resource utilization of a hardware resource on an access terminal;
   determining, based upon the level of resource utilization, that the hardware resource cannot support a downlink data transmission rate;
   generating a channel quality indicator report that includes a selected value selected as a function of the level of resource utilization of the hardware resource on the access terminal, wherein the channel quality indicator report comprises a request to reduce the downlink data transmission rate to temporarily mitigate hardware resource requirements for the access terminal;
   selecting a first flow control code word for inclusion in the channel quality indicator report to reduce the downlink data transmission rate employed by a base station, the first flow control code word being reserved in a channel quality indicator code space;
   selecting a second flow control code word for inclusion in the channel quality indicator report to increase the downlink data transmission rate employed by the base station, the second flow control code word being reserved in the channel quality indicator code space; and
   transmitting the channel quality indicator report that includes the selected value to the base station.

2. The method of claim 1, further comprising selecting a flow control code word for inclusion in the channel quality indicator report to reduce the downlink data transmission rate employed by the base station for a predetermined period of time, the flow control code word being reserved in the channel quality indicator code space.

3. The method of claim 1, further comprising transmitting the channel quality indicator report that includes the selected value to the base station during a corresponding flow control reporting interval, wherein every Xth channel quality indicator reporting interval is a flow control reporting interval and X is an integer.

4. The method of claim 3, further comprising:
   selecting a predetermined value as the value for inclusion in the channel quality indicator report to be transmitted during the corresponding flow control reporting interval when the level of resource utilization exceeds a threshold; and
   selecting a measured channel quality indicator value that is dependent upon channel conditions as the value for inclusion in the channel quality indicator report to be transmitted during the corresponding flow control reporting interval when the level of resource utilization is below the threshold.

5. The method of claim 3, further comprising:
selecting a resource dependent channel quality indicator value, which is a measured channel quality indicator value that is dependent upon channel conditions reduced by a factor corresponding to the level of resource utilization, as the value for inclusion in the channel quality indicator report to be transmitted during the corresponding flow control reporting interval when the level of resource utilization exceeds a threshold; and
selecting the measured channel quality indicator value as the value for inclusion in the channel quality indicator report to be transmitted during the corresponding flow control reporting interval when the level of resource utilization is below the threshold.

6. A wireless communications apparatus, comprising:
a memory that retains instructions related to:
detecting a level of resource utilization of a hardware resource on an access terminal,
determining, based upon the level of resource utilization, that the hardware resource cannot support a downlink data transmission rate,
generating a channel quality indicator report that includes a selected value selected as a function of the level of resource utilization of the hardware resource on the access terminal, wherein the channel quality indicator report comprises a request to reduce the downlink data transmission rate to temporarily mitigate hardware resource requirements for the access terminal,
selecting a first flow control code word for inclusion in the channel quality indicator report to reduce the downlink data transmission rate employed by a base station,
selecting a second flow control code word for inclusion in the channel quality indicator report to increase the downlink data transmission rate employed by the base station, the first flow control code word and the second flow control code word being reserved in a channel quality indicator code space, and
transmitting the channel quality indicator report that includes the selected value to the base station; and
a processor, coupled to the memory, configured to execute the instructions retained in the memory.

7. The wireless communications apparatus of claim 6, wherein the memory further retains instructions related to selecting a flow control code word for inclusion in the channel quality indicator report to reduce the downlink data transmission rate employed by the base station for a predetermined period of time, the flow control code word being reserved in the channel quality indicator code space.

8. The wireless communications apparatus of claim 6, wherein the memory further retains instructions related to transmitting the channel quality indicator report that includes the selected value to the base station during a corresponding flow control reporting interval, wherein every Xth channel quality indicator reporting interval is a flow control reporting interval and X is an integer.

9. The wireless communications apparatus of claim 8, wherein the memory further retains instructions related to:
selecting a predetermined value as the value for inclusion in the channel quality indicator report to be transmitted during the corresponding flow control reporting interval when the level of resource utilization exceeds a threshold, and
selecting a measured channel quality indicator value that is dependent upon channel conditions as the value for inclusion in the channel quality indicator report to be transmitted during the corresponding flow control reporting interval when the level of resource utilization is below the threshold.

10. The wireless communications apparatus of claim 8, wherein the memory further retains instructions related to:
selecting a resource dependent channel quality indicator value, which is a measured channel quality indicator value that is dependent upon channel conditions reduced by a factor corresponding to the level of resource utilization, as the value for inclusion in the channel quality indicator report to be transmitted during the corresponding flow control reporting interval when the level of resource utilization exceeds a threshold, and
selecting the measured channel quality indicator value as the value for inclusion in the channel quality indicator report to be transmitted during the corresponding flow control reporting interval when the level of resource utilization is below the threshold.

11. A wireless communications apparatus, comprising:
means for detecting a level of resource utilization of a hardware resource on an access terminal;
means for determining, based upon the level of resource utilization, that the hardware resource cannot support a downlink data transmission rate;
means for yielding a channel quality indicator report that includes a selected value selected as a function of the level of resource utilization of the hardware resource on the access terminal, wherein the channel quality indicator report comprises a request to reduce the downlink data transmission rate to temporarily mitigate hardware resource requirements for the access terminal;
means for selecting a first flow control code word for inclusion in the channel quality indicator report to reduce the downlink data transmission rate employed by a base station, the first flow control code word being reserved in a channel quality indicator code space;
means for selecting a second flow control code word for inclusion in the channel quality indicator report to increase the downlink data transmission rate employed by the base station, the second flow control code word being reserved in the channel quality indicator code space; and
means for sending the channel quality indicator report that includes the selected value to the base station.

12. The wireless communications apparatus of claim 11, further comprising means for selecting a flow control code word for inclusion in the channel quality indicator report to reduce the downlink data transmission rate employed by the base station for a predetermined period of time, the flow control code word being reserved in the channel quality indicator code space.

13. The wireless communications apparatus of claim 11, further comprising means for sending the channel quality indicator report that includes the selected value to the base station during a corresponding flow control reporting interval, wherein reporting intervals included in a predetermined subset of channel quality indicator reporting intervals are used as a flow control reporting intervals.

14. The wireless communications apparatus of claim 13, further comprising:
means for selecting a predetermined value as the value for inclusion in the channel quality indicator report to be sent during the corresponding flow control reporting interval when the level of resource utilization exceeds a threshold; and means for selecting a measured channel quality indicator value that is dependent upon channel conditions as the value for inclusion in the channel quality indicator report to be sent during the corresponding flow control reporting interval when the level of resource utilization is below the threshold.

15. The wireless communications apparatus of claim 13, further comprising:
means for selecting a resource dependent channel quality indicator value, which is a measured channel quality indicator value that is dependent upon channel conditions reduced by a factor corresponding to the level of resource utilization, as the value for inclusion in the channel quality indicator report to be sent during the corresponding flow control reporting interval when the level of resource utilization exceeds a threshold; and
means for selecting the measured channel quality indicator value as the value for inclusion in the channel quality indicator report to be sent during the corresponding flow control reporting interval when the level of resource utilization is below the threshold.

16. A non-transitory computer-readable medium comprising:
code for detecting a level of resource utilization of a hardware resource on an access terminal;
code for determining, based upon the level of resource utilization, that the hardware resource cannot support a downlink data transmission rate;
code for generating a channel quality indicator report that includes a selected value selected as a function of the level of resource utilization of the hardware resource on the access terminal, wherein the channel quality indicator report comprises a request to reduce the downlink data transmission rate to temporarily mitigate hardware resource requirements for the access terminal;
code for selecting a first flow control code word for inclusion in the channel quality indicator report to reduce the downlink data transmission rate employed by a base station, the first flow control code word being reserved in a channel quality indicator code space;
code for selecting a second flow control code word for inclusion in the channel quality indicator report to increase the downlink data transmission rate employed by the base station, the second flow control code word being reserved in the channel quality indicator code space; and
code for transmitting the channel quality indicator report that includes the selected value to the base station.

17. The non-transitory computer-readable medium of claim 16, further comprising code for selecting a flow control code word for inclusion in the channel quality indicator report to reduce the downlink data transmission rate employed by the base station for a predetermined period of time, the flow control code word being reserved in the channel quality indicator code space.

18. The non-transitory computer-readable medium of claim 16, further comprising code for transmitting the channel quality indicator report that includes the selected value to the base station during a corresponding flow control reporting interval, wherein every Xth channel quality indicator reporting interval is a flow control reporting interval and X is an integer.

19. The non-transitory computer-readable medium of claim 18, further comprising:
code for selecting a predetermined value as the value for inclusion in the channel quality indicator report to be transmitted during the corresponding flow control reporting interval when the level of resource utilization exceeds a threshold; and
code for selecting a measured channel quality indicator value that is dependent upon channel conditions as the value for inclusion in the channel quality indicator report to be transmitted during the corresponding flow control reporting interval when the level of resource utilization is below the threshold.

20. The non-transitory computer-readable medium of claim 18, further comprising:
code for selecting a resource dependent channel quality indicator value, which is a measured channel quality indicator value that is dependent upon channel conditions reduced by a factor corresponding to the level of resource utilization, as the value for inclusion in the channel quality indicator report to be transmitted during the corresponding flow control reporting interval when the level of resource utilization exceeds a threshold; and
code for selecting the measured channel quality indicator value as the value for inclusion in the channel quality indicator report to be transmitted during the corresponding flow control reporting interval when the level of resource utilization is below the threshold.

* * * * *